United States Patent
Feng et al.

(10) Patent No.: US 10,868,647 B2
(45) Date of Patent: Dec. 15, 2020

(54) METHOD AND APPARATUS FOR SEPARATING A CELL CLUSTER FOR LTE EIMTA INTERFERENCE MITIGATION

(71) Applicant: QUALCOMM Incorporated, San Diego, CA (US)

(72) Inventors: Minghai Feng, Beijing (CN); Jiming Guo, Beijing (CN); Neng Wang, Beijing (CN); Jilei Hou, Beijing (CN); Hao Xu, San Diego, CA (US); Peter Gaal, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 862 days.

(21) Appl. No.: 14/429,710

(22) PCT Filed: Apr. 7, 2013

(86) PCT No.: PCT/CN2013/073825
§ 371 (c)(1),
(2) Date: Mar. 19, 2015

(87) PCT Pub. No.: WO2014/044046
PCT Pub. Date: Mar. 27, 2014

(65) Prior Publication Data
US 2015/0270933 A1    Sep. 24, 2015

(30) Foreign Application Priority Data

Sep. 19, 2012 (WO) ................ PCT/CN2012/081595

(51) Int. Cl.
*H04L 5/00* (2006.01)
*H04B 7/26* (2006.01)
(Continued)

(52) U.S. Cl.
CPC ......... *H04L 5/0032* (2013.01); *H04B 7/2656* (2013.01); *H04L 5/14* (2013.01); *H04W 72/0413* (2013.01)

(58) Field of Classification Search
CPC ....... H04B 7/2656; H04L 5/0032; H04L 5/14; H04W 72/0413
(Continued)

(56) References Cited

U.S. PATENT DOCUMENTS

2013/0010964 A1* 1/2013 Fong ............... H04L 5/0053
                                                    380/277
2013/0215789 A1* 8/2013 Lim ............... H04L 41/0803
                                                    370/254
(Continued)

FOREIGN PATENT DOCUMENTS

CN    102067649 A    5/2011
CN    102197665 A    9/2011
(Continued)

OTHER PUBLICATIONS

1 Itri: "Interference Mitigation for TDD Recognition in Multi-Picocell Scenario," 3GPP TSG WG1 Meeting #69, vol. R1-122440, May 21, 2012, XP055269378, Retrieved from the Internet URL: http://www.3gpp.org/DynaReport/TDoc/ExMtg--R1-69-29002.htm [retrieved on Apr. 28, 2016].
(Continued)

*Primary Examiner* — Jason E Mattis
*Assistant Examiner* — Nizam U Ahmed
(74) *Attorney, Agent, or Firm* — Arent Fox, LLP

(57) ABSTRACT

A method, a computer program product, and an apparatus for separating a cell cluster to two or more cell clusters are provided. The cell cluster may be separated into two or more cell clusters in order to mitigate interference between cells while allowing for TDD subframe configuration flexibility.

(Continued)

P1, P2, P3, P4 are cells

The method identifies at least one separating cell in a cell cluster, the cell cluster including at least two cells having a common TDD subframe configuration, where a coupling loss between one cell in the cell cluster and at least another cell in the cell cluster is lower than a predefined threshold. The method separates the cell cluster based on the at least one separating cell into at least a first cell cluster and a second cell cluster and sets a first TDD subframe configuration for the first cell cluster and a second TDD subframe configuration for the second cell cluster.

36 Claims, 22 Drawing Sheets

(51) Int. Cl.
*H04L 5/14* (2006.01)
*H04W 72/04* (2009.01)

(58) Field of Classification Search
USPC .......................................................... 370/280
See application file for complete search history.

(56) References Cited

U.S. PATENT DOCUMENTS

| | | | | |
|---|---|---|---|---|
| 2013/0242812 | A1* | 9/2013 | Khoryaev | H04W 52/243 370/278 |
| 2013/0242924 | A1 | 9/2013 | Kim et al. | |
| 2013/0272170 | A1* | 10/2013 | Chatterjee | H04L 5/0094 370/280 |
| 2013/0301423 | A1* | 11/2013 | Sirotkin | H04B 7/0417 370/241.1 |
| 2013/0322235 | A1* | 12/2013 | Khoryaev | H04W 24/10 370/229 |
| 2015/0043392 | A1* | 2/2015 | Susitaival | H04L 5/1469 370/280 |

FOREIGN PATENT DOCUMENTS

| | | |
|---|---|---|
| CN | 102308609 A | 1/2012 |
| JP | 2009177817 A | 8/2009 |
| JP | 2015528679 | 9/2015 |
| WO | 2009041775 A2 | 4/2009 |
| WO | 2010026043 A1 | 3/2010 |
| WO | 2010085190 A1 | 7/2010 |
| WO | 2012067430 A2 | 5/2012 |

OTHER PUBLICATIONS

CATT: "Discussion on Interference Mitigation Schemes for FS_LTE_TDD_Eimta," 3GPP Draft; R1-122061, 3rd Generation Partnership Project (3GPP), Mobile Competence Centre; 650, Route Des Lucioles; F-06921 Sophia-Antipolis Cedex; France, vol. RAN WG1, No. Prague, Czech Republic; May 21, 2012-May 25, 2012, May 12, 2012, XP050600351, [retrieved on May 12, 2012].

CATT: "Evaluation on TDD UL/DL Reconfiguration with Interference Mitigation in Multi-cell Pico Scenario," 3GPP Draft; R1-122209, 3rd Generation Partnership Project (3GPP), Mobile Competence Centre; 650, Route Des Lucioles; F-06921 Sophia-Antipolis Cedex; France, vol. RAN WG1, No. Prague, Czech Republic; May 21, 2012-May 25, 2012, May 12, 2012, XP050600473, [retrieved on May 12, 2012].

CATT: "TP for TR36.828 Section 8," 3GPP Draft; R1-122944, 3rd Generation Partnership Project (3GPP), Mobile Competence Centre; 650, Route Des Lucioles; F-06921 Sophia-Antipolis Cedex; France, vol. RAN WG1, No. Prague, Czech Republic; May 21, 2012-May 25, 2012, May 21, 2012, XP050601306, [retrieved on Jun. 12, 2012].

European Search Report—EP13838562—Search Authority—The Hague—dated May 10, 2016.

Intel Corporation: "Performance Analysis of DL-UL Interference Management and Traffic Adaptation in Multi-cell Pico-Pico Deployment Scenario," 3GPP TSG-RAN WG1 #68bis, vol. R1-121529, Mar. 26, 2012, XP055269366, Retrieved from the Internet URL: http://www.3gpp.org/DynaReport/TDocExMtg-R1-68b-29001.htm [retrieved on Apr. 28, 2016].

International Search Report and Written Opinion—PCT/CN2012/081595—ISA/EPO—dated Jun. 27, 2013.

International Search Report and Written Opinion—PCT/CN2013/073825—ISA/EPO—dated Jul. 18, 2013.

* cited by examiner

P1, P2, P3, P4 are cells

METHOD AND APPARATUS FOR SEPARATING A CELL CLUSTER FOR LTE EIMTA INTERFERENCE MITIGATION

CROSS-REFERENCE TO RELATED APPLICATION(S)

This application claims the benefit of International Application No. PCT/CN2012/081595, entitled "Method and Apparatus for Separating a Cell Cluster for LTE EIMTA Interference Mitigation" and filed on Sep. 19, 2012, which is expressly incorporated by reference herein in its entirety.

BACKGROUND

Field

The present disclosure relates generally to communication systems, and more particularly, to a method and apparatus for separating a cell cluster for LTE eIMTA interference mitigation.

Background

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example of an emerging telecommunication standard is Long Term Evolution (LTE). LTE is a set of enhancements to the Universal Mobile Telecommunications System (UMTS) mobile standard promulgated by Third Generation Partnership Project (3GPP). It is designed to better support mobile broadband Internet access by improving spectral efficiency, lower costs, improve services, make use of new spectrum, and better integrate with other open standards using OFDMA on the downlink (DL), SC-FDMA on the uplink (UL), and multiple-input multiple-output (MIMO) antenna technology. However, as the demand for mobile broadband access continues to increase, there exists a need for further improvements in LTE technology. Preferably, these improvements should be applicable to other multi-access technologies and the telecommunication standards that employ these technologies.

SUMMARY

In an aspect of the disclosure, a method, a computer program product, and an apparatus for separating a cell cluster to two or more cell clusters are provided. The cell cluster may be separated into two or more cell clusters in order to mitigate interference between the cells while allowing for time division duplex (TDD) subframe configuration flexibility. The method may identify at least one separating cell in a cell cluster, the cell cluster comprising at least two cells having a common TDD subframe configuration, where a coupling loss between one cell in the cell cluster and at least another cell in the cell cluster is lower than a predefined threshold. The method may separate the cell cluster based on the at least one separating cell to form at least a first cell cluster and a second cell cluster and may set a first TDD subframe configuration for the first cell cluster and a second TDD subframe configuration for the second cell cluster.

DETAILED DESCRIPTION

Figure 1:
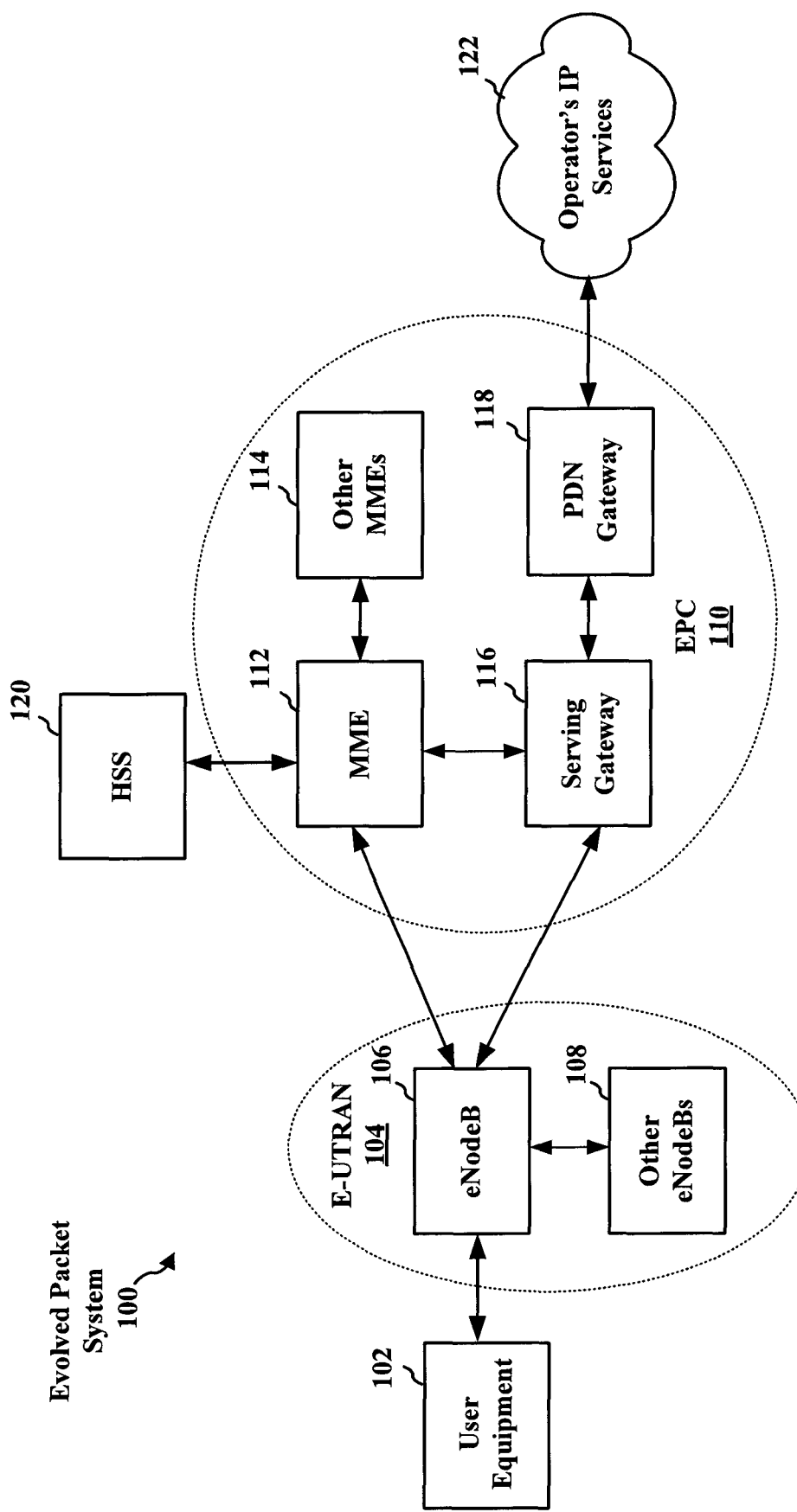
FIG. 1 is a diagram illustrating an example of a network architecture.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Accordingly, in one or more exemplary embodiments, the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), and floppy disk where disks usually reproduce data magnetically, while discs reproduce data optically with lasers. Combinations of the above should also be included within the scope of computer-readable media.

FIG. 1 is a diagram illustrating an LTE network architecture 100. The LTE network architecture 100 may be referred to as an Evolved Packet System (EPS) 100. The EPS 100 may include one or more user equipment (UE) 102, an Evolved UMTS Terrestrial Radio Access Network (E-UTRAN) 104, an Evolved Packet Core (EPC) 110, a Home Subscriber Server (HSS) 120, and an Operator's IP Services 122. The EPS can interconnect with other access networks, but for simplicity those entities/interfaces are not shown. As shown, the EPS provides packet-switched services, however, as those skilled in the art will readily appreciate, the various concepts presented throughout this disclosure may be extended to networks providing circuit-switched services.

The E-UTRAN includes the evolved Node B (eNB) 106 and other eNBs 108. The eNB 106 provides user and control planes protocol terminations toward the UE 102. The eNB 106 may be connected to the other eNBs 108 via a backhaul (e.g., an X2 interface). The eNB 106 may also be referred to as a base station, a base transceiver station, a radio base station, a radio transceiver, a transceiver function, a basic service set (BSS), an extended service set (ESS), or some other suitable terminology. The eNB 106 provides an access point to the EPC 110 for a UE 102. Examples of UEs 102 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, or any other similar functioning device. The UE 102 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

The eNB 106 is connected by an S1 interface to the EPC 110. The EPC 110 includes a Mobility Management Entity (MME) 112, other MMEs 114, a Serving Gateway 116, and a Packet Data Network (PDN) Gateway 118. The MME 112 is the control node that processes the signaling between the UE 102 and the EPC 110. Generally, the MME 112 provides bearer and connection management. All user IP packets are transferred through the Serving Gateway 116, which itself is connected to the PDN Gateway 118. The PDN Gateway 118 provides UE IP address allocation as well as other functions. The PDN Gateway 118 is connected to the Operator's IP Services 122. The Operator's IP Services 122 may include the Internet, the Intranet, an IP Multimedia Subsystem (IMS), and a PS Streaming Service (PSS).

Figure 2:
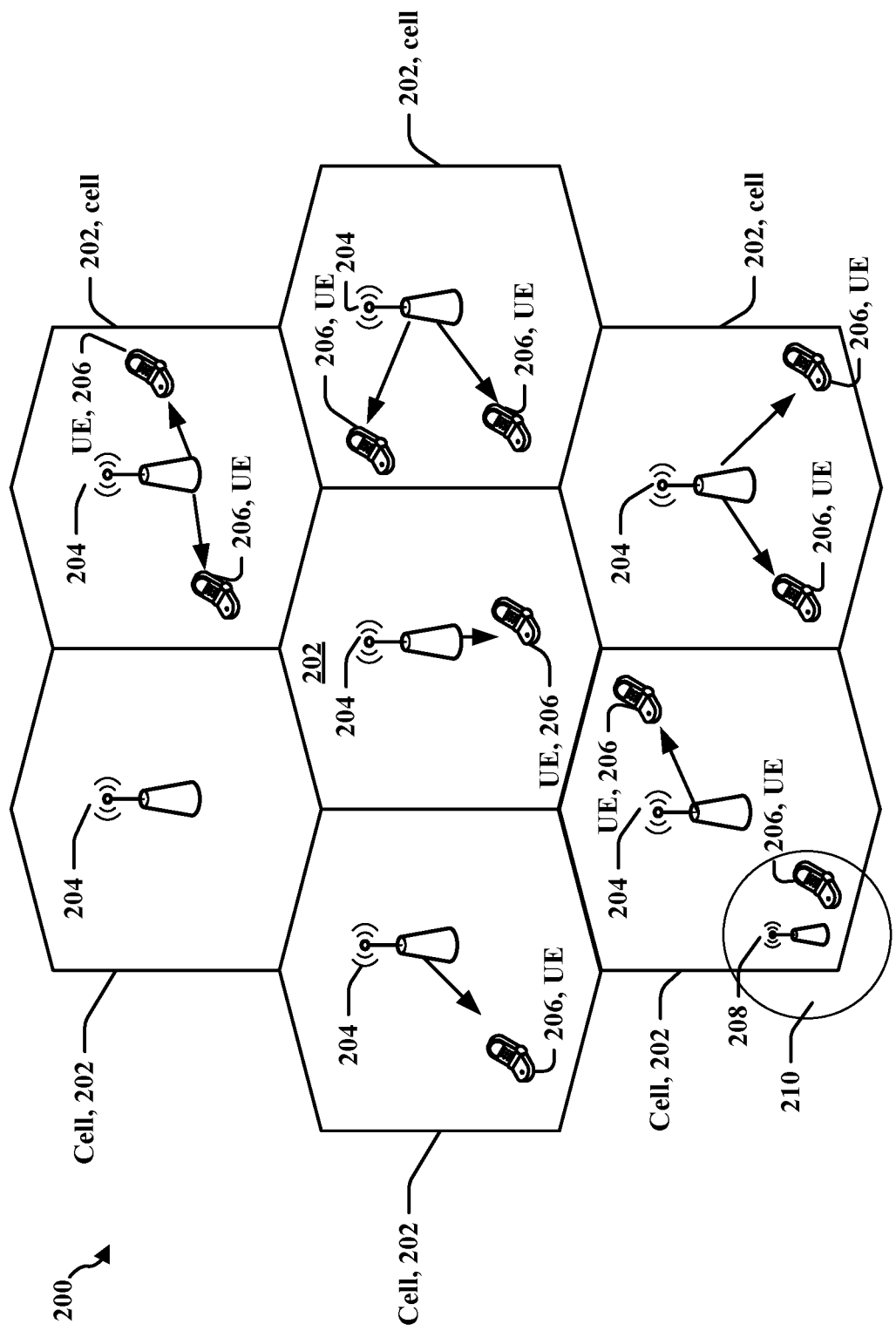
FIG. 2 is a diagram illustrating an example of an access network.

FIG. 2 is a diagram illustrating an example of an access network 200 in an LTE network architecture. In this example, the access network 200 is divided into a number of cellular regions (cells) 202. One or more lower power class eNBs 208 may have cellular regions 210 that overlap with one or more of the cells 202. The lower power class eNB 208 may be a femto cell (e.g., home eNB (HeNB)), pico cell, micro cell, or remote radio head (RRH). The macro eNBs 204 are each assigned to a respective cell 202 and are configured to provide an access point to the EPC 110 for all the UEs 206 in the cells 202. There is no centralized controller in this example of an access network 200, but a centralized controller may be used in alternative configurations. The eNBs 204 are responsible for all radio related functions including radio bearer control, admission control, mobility control, scheduling, security, and connectivity to the serving gateway 116.

The modulation and multiple access scheme employed by the access network 200 may vary depending on the particular telecommunications standard being deployed. In LTE applications, OFDM is used on the DL and SC-FDMA is used on the UL to support both frequency division duplexing (FDD) and time division duplexing (TDD). As those skilled in the art will readily appreciate from the detailed description to follow, the various concepts presented herein are well suited for LTE applications. However, these concepts may be readily extended to other telecommunication standards employing other modulation and multiple access techniques. By way of example, these concepts may be extended to Evolution-Data Optimized (EV-DO) or Ultra Mobile Broadband (UMB). EV-DO and UMB are air interface standards promulgated by the 3rd Generation Partnership Project 2 (3GPP2) as part of the CDMA2000 family of standards and employs CDMA to provide broadband Internet access to mobile stations. These concepts may also be extended to Universal Terrestrial Radio Access (UTRA) employing Wideband-CDMA (W-CDMA) and other variants of CDMA, such as TD-SCDMA; Global System for Mobile Communications (GSM) employing TDMA; and Evolved UTRA (E-UTRA), IEEE 802.11 (Wi-Fi), IEEE 802.16 (WiMAX), IEEE 802.20, and Flash-OFDM employing OFDMA. UTRA, E-UTRA, UMTS, LTE and GSM are described in documents from the 3GPP organization. CDMA2000 and UMB are described in documents from the 3GPP2 organization. The actual wireless communication standard and the multiple access technology employed will depend on the specific application and the overall design constraints imposed on the system.

The eNBs 204 may have multiple antennas supporting MIMO technology. The use of MIMO technology enables the eNBs 204 to exploit the spatial domain to support spatial multiplexing, beamforming, and transmit diversity. Spatial multiplexing may be used to transmit different streams of data simultaneously on the same frequency. The data streams may be transmitted to a single UE 206 to increase the data rate or to multiple UEs 206 to increase the overall system capacity. This is achieved by spatially precoding each data stream (i.e., applying a scaling of an amplitude and a phase) and then transmitting each spatially precoded stream through multiple transmit antennas on the DL. The spatially precoded data streams arrive at the UE(s) 206 with different spatial signatures, which enables each of the UE(s) 206 to recover the one or more data streams destined for that UE 206. On the UL, each UE 206 transmits a spatially precoded data stream, which enables the eNB 204 to identify the source of each spatially precoded data stream.

Spatial multiplexing is generally used when channel conditions are good. When channel conditions are less favorable, beamforming may be used to focus the transmission energy in one or more directions. This may be achieved by spatially precoding the data for transmission through multiple antennas. To achieve good coverage at the edges of the cell, a single stream beamforming transmission may be used in combination with transmit diversity.

In the detailed description that follows, various aspects of an access network will be described with reference to a MIMO system supporting OFDM on the DL. OFDM is a spread-spectrum technique that modulates data over a number of subcarriers within an OFDM symbol. The subcarriers are spaced apart at precise frequencies. The spacing provides "orthogonality" that enables a receiver to recover the data from the subcarriers. In the time domain, a guard interval (e.g., cyclic prefix) may be added to each OFDM symbol to combat inter-OFDM-symbol interference. The UL may use SC-FDMA in the form of a DFT-spread OFDM signal to compensate for high peak-to-average power ratio (PAPR).

Figure 3:
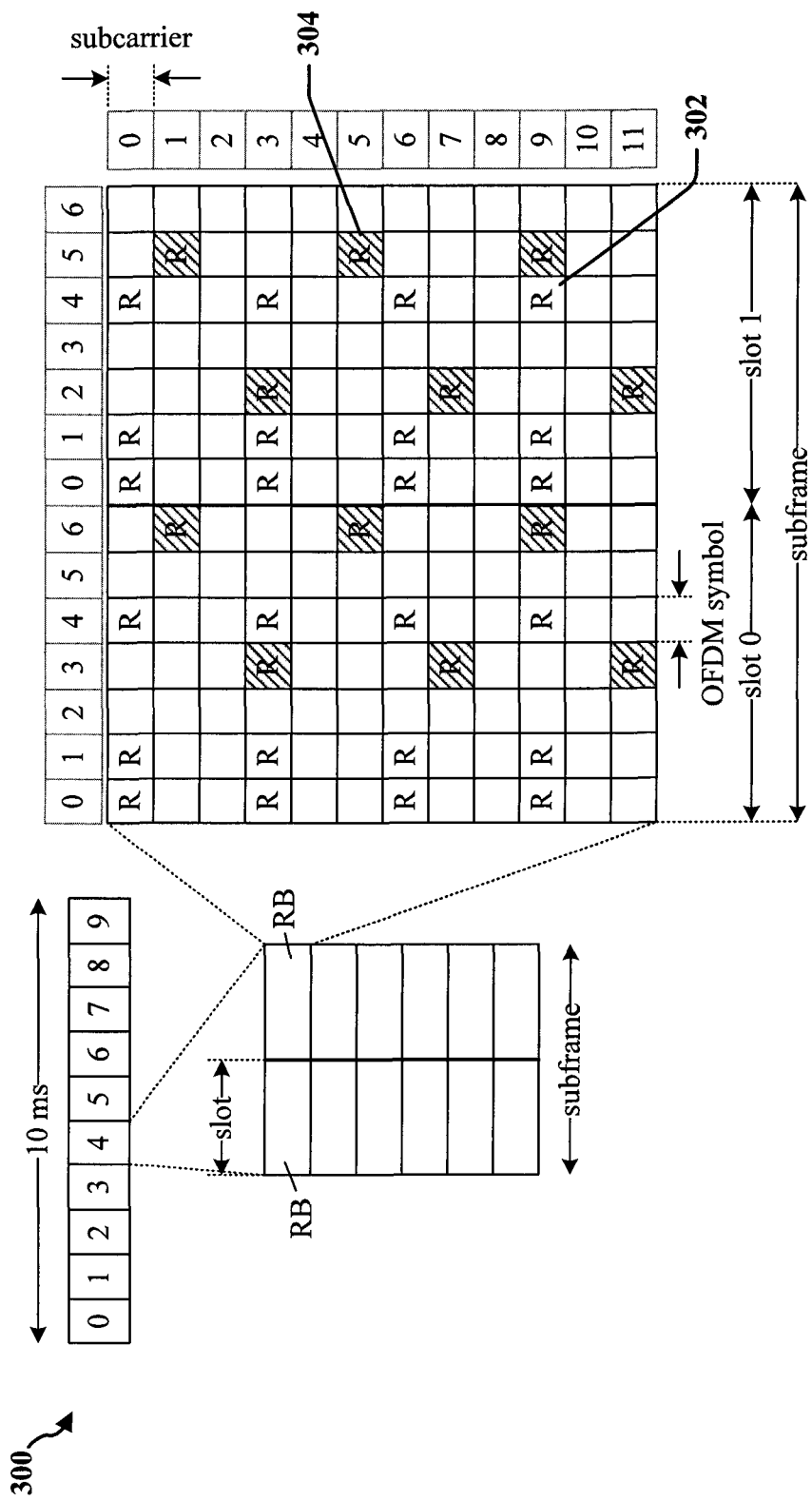
FIG. 3 is a diagram illustrating an example of a DL frame structure in LTE.

FIG. 3 is a diagram 300 illustrating an example of a DL frame structure in LTE. A frame (10 ms) may be divided into 10 equally sized sub-frames. Each sub-frame may include two consecutive time slots. A resource grid may be used to represent two time slots, each time slot including a resource block. The resource grid is divided into multiple resource elements. In LTE, a resource block contains 12 consecutive subcarriers in the frequency domain and, for a normal cyclic prefix in each OFDM symbol, 7 consecutive OFDM symbols in the time domain, or 84 resource elements. For an extended cyclic prefix, a resource block contains 6 consecutive OFDM symbols in the time domain and has 72 resource elements. Some of the resource elements, as indicated as R 302, 304, include DL reference signals (DL-RS). The DL-RS include Cell-specific RS (CRS) (also sometimes called common RS) 302 and UE-specific RS (UE-RS) 304. UE-RS 304 are transmitted only on the resource blocks upon which the corresponding physical DL shared channel (PDSCH) is mapped. The number of bits carried by each resource element depends on the modulation scheme. Thus, the more resource blocks that a UE receives and the higher the modulation scheme, the higher the data rate for the UE.

Figure 4:
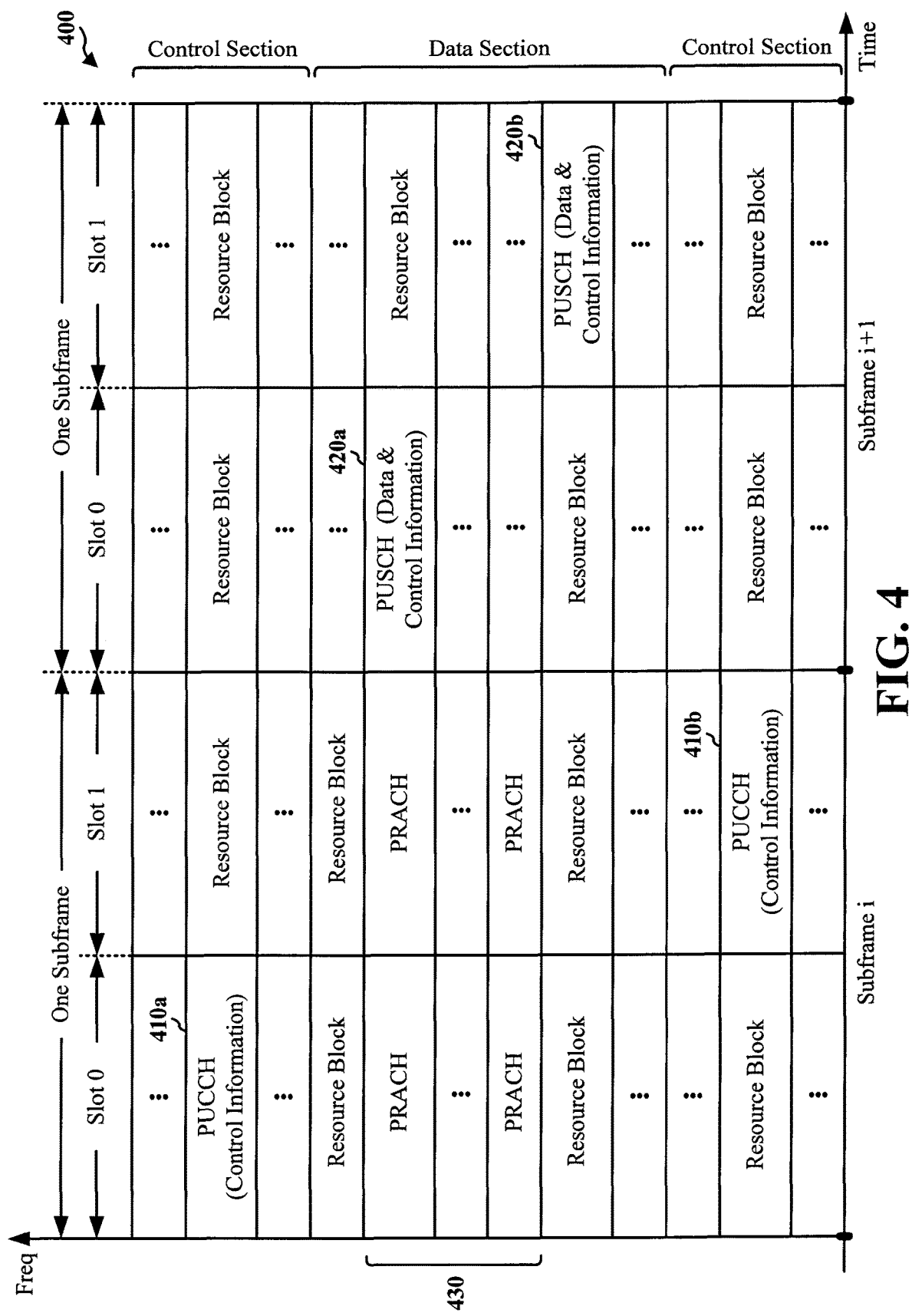
FIG. 4 is a diagram illustrating an example of an UL frame structure in LTE.

FIG. 4 is a diagram 400 illustrating an example of an UL frame structure in LTE. The available resource blocks for the UL may be partitioned into a data section and a control section. The control section may be formed at the two edges of the system bandwidth and may have a configurable size. The resource blocks in the control section may be assigned to UEs for transmission of control information. The data section may include all resource blocks not included in the control section. The UL frame structure results in the data section including contiguous subcarriers, which may allow a single UE to be assigned all of the contiguous subcarriers in the data section.

A UE may be assigned resource blocks 410a, 410b in the control section to transmit control information to an eNB. The UE may also be assigned resource blocks 420a, 420b in the data section to transmit data to the eNB. The UE may transmit control information in a physical UL control channel (PUCCH) on the assigned resource blocks in the control section. The UE may transmit only data or both data and control information in a physical UL shared channel (PUSCH) on the assigned resource blocks in the data section. A UL transmission may span both slots of a subframe and may hop across frequency.

A set of resource blocks may be used to perform initial system access and achieve UL synchronization in a physical random access channel (PRACH) 430. The PRACH 430 carries a random sequence and cannot carry any UL data/signaling. Each random access preamble occupies a bandwidth corresponding to six consecutive resource blocks. The starting frequency is specified by the network. That is, the transmission of the random access preamble is restricted to certain time and frequency resources. There is no frequency hopping for the PRACH. The PRACH attempt is carried in a single subframe (1 ms) or in a sequence of few contiguous subframes and a UE can make only a single PRACH attempt per frame (10 ms).

Figure 5:
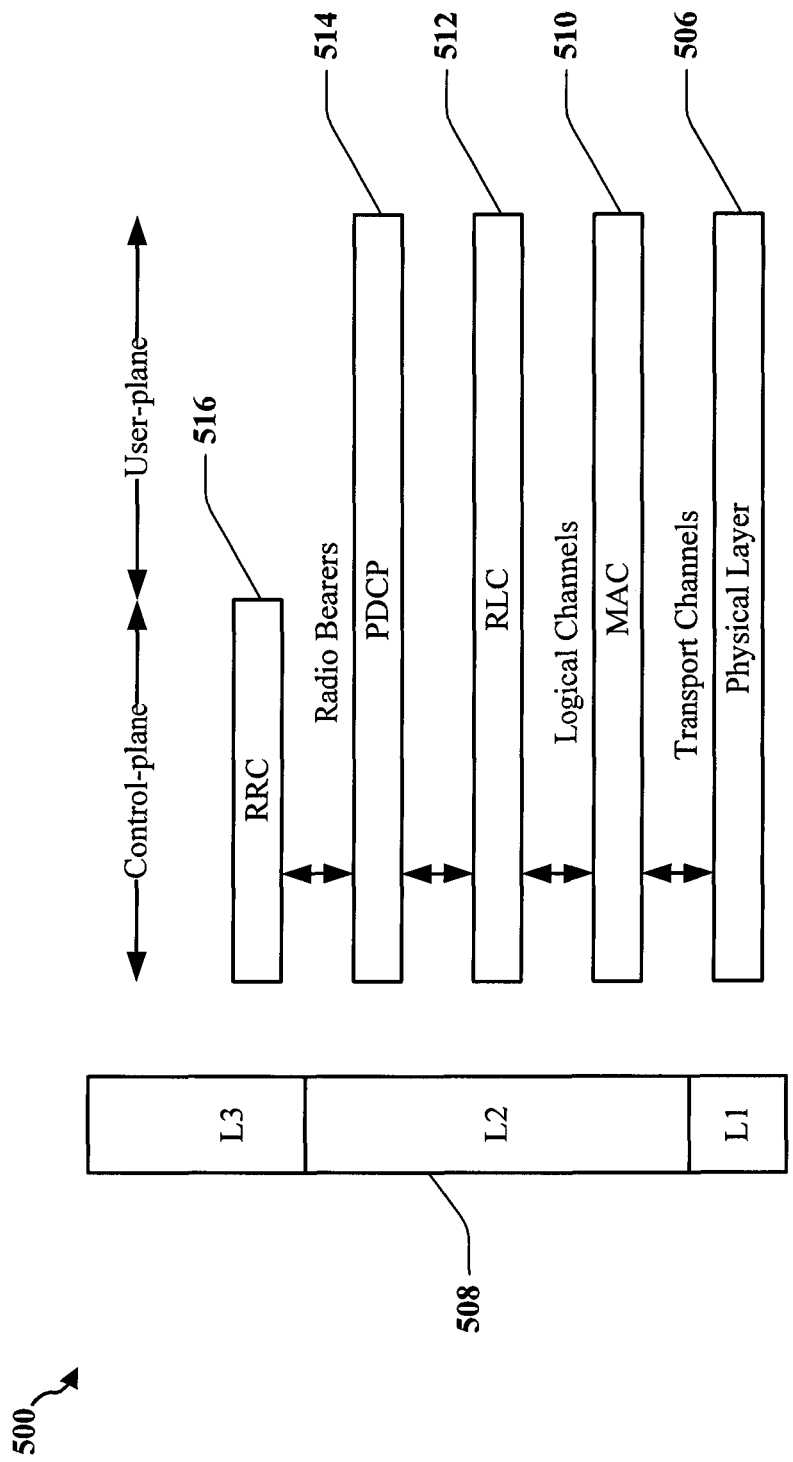
FIG. 5 is a diagram illustrating an example of a radio protocol architecture for the user and control planes.

FIG. 5 is a diagram 500 illustrating an example of a radio protocol architecture for the user and control planes in LTE. The radio protocol architecture for the UE and the eNB is shown with three layers: Layer 1, Layer 2, and Layer 3. Layer 1 (L1 layer) is the lowest layer and implements various physical layer signal processing functions. The L1 layer will be referred to herein as the physical layer 506. Layer 2 (L2 layer) 508 is above the physical layer 506 and is responsible for the link between the UE and eNB over the physical layer 506.

In the user plane, the L2 layer 508 includes a media access control (MAC) sublayer 510, a radio link control (RLC) sublayer 512, and a packet data convergence protocol (PDCP) 514 sublayer, which are terminated at the eNB on the network side. Although not shown, the UE may have several upper layers above the L2 layer 508 including a network layer (e.g., IP layer) that is terminated at the PDN gateway 118 on the network side, and an application layer that is terminated at the other end of the connection (e.g., far end UE, server, etc.).

The PDCP sublayer 514 provides multiplexing between different radio bearers and logical channels. The PDCP sublayer 514 also provides header compression for upper layer data packets to reduce radio transmission overhead, security by ciphering the data packets, and handover support for UEs between eNBs. The RLC sublayer 512 provides segmentation and reassembly of upper layer data packets, retransmission of lost data packets, and reordering of data packets to compensate for out-of-order reception due to hybrid automatic repeat request (HARD). The MAC sublayer 510 provides multiplexing between logical and transport channels. The MAC sublayer 510 is also responsible for allocating the various radio resources (e.g., resource blocks) in one cell among the UEs. The MAC sublayer 510 is also responsible for HARQ operations.

In the control plane, the radio protocol architecture for the UE and eNB is substantially the same for the physical layer 506 and the L2 layer 508 with the exception that there is no header compression function for the control plane. The control plane also includes a radio resource control (RRC) sublayer 516 in Layer 3 (L3 layer). The RRC sublayer 516 is responsible for obtaining radio resources (i.e., radio bearers) and for configuring the lower layers using RRC signaling between the eNB and the UE.

Figure 6:
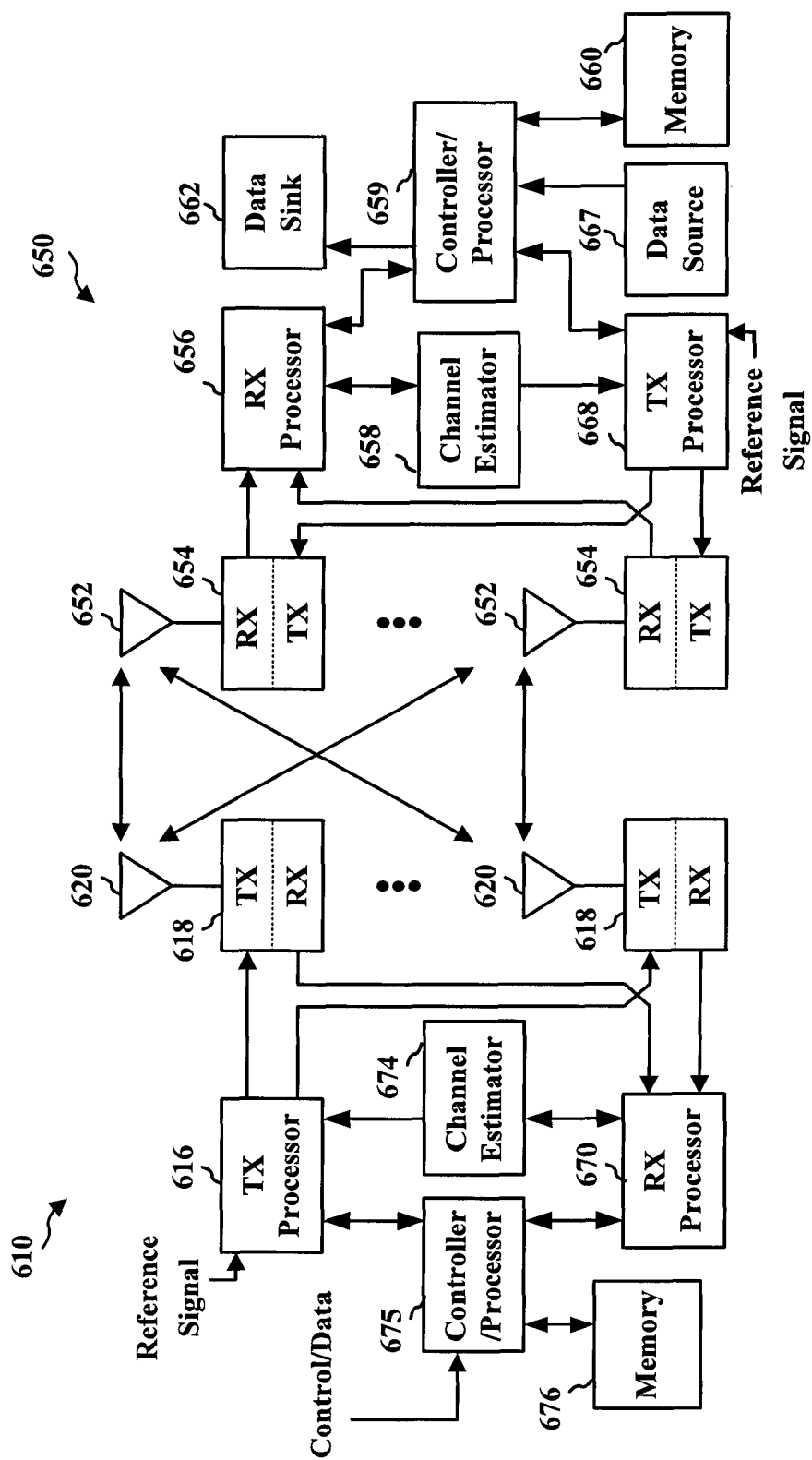
FIG. 6 is a diagram illustrating an example of an evolved Node B and user equipment in an access network.

FIG. 6 is a block diagram of an eNB 610 in communication with a UE 650 in an access network. In the DL, upper layer packets from the core network are provided to a controller/processor 675. The controller/processor 675 implements the functionality of the L2 layer. In the DL, the controller/processor 675 provides header compression, ciphering, packet segmentation and reordering, multiplexing between logical and transport channels, and radio resource allocations to the UE 650 based on various priority metrics. The controller/processor 675 is also responsible for HARQ operations, retransmission of lost packets, and signaling to the UE 650.

The transmit (TX) processor 616 implements various signal processing functions for the L1 layer (i.e., physical layer). The signal processing functions include coding and interleaving to facilitate forward error correction (FEC) at the UE 650 and mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols are then split into parallel streams. Each stream is then mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 674 may be used to determine the coding and modulation scheme, as well as for spatial processing. The channel estimate may be derived from a reference signal and/or channel condition feedback transmitted by the UE 650. Each spatial stream is then provided to a different antenna 620 via a separate transmitter 618TX. Each transmitter 618TX modulates an RF carrier with a respective spatial stream for transmission.

At the UE 650, each receiver 654RX receives a signal through its respective antenna 652. Each receiver 654RX recovers information modulated onto an RF carrier and provides the information to the receive (RX) processor 656.

The RX processor 656 implements various signal processing functions of the L1 layer. The RX processor 656 performs spatial processing on the information to recover any spatial streams destined for the UE 650. If multiple spatial streams are destined for the UE 650, they may be combined by the RX processor 656 into a single OFDM symbol stream. The RX processor 656 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, is recovered and demodulated by determining the most likely signal constellation points transmitted by the eNB 610. These soft decisions may be based on channel estimates computed by the channel estimator 658. The soft decisions are then decoded and deinterleaved to recover the data and control signals that were originally transmitted by the eNB 610 on the physical channel. The data and control signals are then provided to the controller/processor 659.

The controller/processor 659 implements the L2 layer. The controller/processor can be associated with a memory 660 that stores program codes and data. The memory 660 may be referred to as a computer-readable medium. In the UL, the controller/processor 659 provides demultiplexing between transport and logical channels, packet reassembly, deciphering, header decompression, control signal processing to recover upper layer packets from the core network. The upper layer packets are then provided to a data sink 662, which represents all the protocol layers above the L2 layer. Various control signals may also be provided to the data sink 662 for L3 processing. The controller/processor 659 is also responsible for error detection using an acknowledgement (ACK) and/or negative acknowledgement (NACK) protocol to support HARQ operations.

In the UL, a data source 667 is used to provide upper layer packets to the controller/processor 659. The data source 667 represents all protocol layers above the L2 layer. Similar to the functionality described in connection with the DL transmission by the eNB 610, the controller/processor 659 implements the L2 layer for the user plane and the control plane by providing header compression, ciphering, packet segmentation and reordering, and multiplexing between logical and transport channels based on radio resource allocations by the eNB 610. The controller/processor 659 is also responsible for HARQ operations, retransmission of lost packets, and signaling to the eNB 610.

Channel estimates derived by a channel estimator 658 from a reference signal or feedback transmitted by the eNB 610 may be used by the TX processor 668 to select the appropriate coding and modulation schemes, and to facilitate spatial processing. The spatial streams generated by the TX processor 668 are provided to different antenna 652 via separate transmitters 654TX. Each transmitter 654TX modulates an RF carrier with a respective spatial stream for transmission.

The UL transmission is processed at the eNB 610 in a manner similar to that described in connection with the receiver function at the UE 650. Each receiver 618RX receives a signal through its respective antenna 620. Each receiver 618RX recovers information modulated onto an RF carrier and provides the information to a RX processor 670. The RX processor 670 may implement the L1 layer.

The controller/processor 675 implements the L2 layer. The controller/processor 675 can be associated with a memory 676 that stores program codes and data. The memory 676 may be referred to as a computer-readable medium. In the UL, the controller/processor 675 provides demultiplexing between transport and logical channels, packet reassembly, deciphering, header decompression, control signal processing to recover upper layer packets from the UE 650. Upper layer packets from the controller/processor 675 may be provided to the core network. The controller/processor 675 is also responsible for error detection using an ACK and/or NACK protocol to support HARQ operations.

LTE communications standards support both FDD and TDD frame structures. The transmission timeline for the downlink and uplink may be partitioned into units of radio frames, and each radio frame may be partitioned into 10 subframes with indices of 0 through 9. LTE supports a number of uplink-downlink configurations for TDD. Subframes 0 and 5 are used for the downlink and subframe 2 is used for the uplink for all uplink-downlink configurations. Subframes 3, 4, 7, 8 and 9 may each be used for the downlink or uplink depending on the uplink-downlink configuration. Subframe 1 includes three special fields composed of a Downlink Pilot Time Slot (DwPTS) used for downlink control channels as well as data transmission, a Guard Period (GP) of no transmission, and an Uplink Pilot Time Slot (UpPTS) used for either a random access channel (RACH) or sounding reference signals (SRS). Subframe 6 may include only the DwPTS, or all three special fields, or a downlink subframe depending on the uplink-downlink configuration. The DwPTS, GP and UpPTS may have different durations for different subframe configurations. For TDD, each subframe used for the downlink may be referred to as a downlink subframe, and each subframe used for the uplink may be referred to as an uplink subframe.

Changes to the implementation of the standards include the possibility of dynamically adapting TDD DL/UL subframe configurations based on the actual traffic needs. If, during a short duration, a large data burst on downlink is needed, a wireless apparatus may change its configuration from, for example, configuration #1 (6 DL: 4 UL) to configuration #5 (9 DL: 1 UL). The adaptation of TDD configuration is expected to be no slower than 640 ms. In the extreme case, the adaptation may be as fast as 10 ms. Having adjacent cells dynamically switching between different subframe uplink-downlink configurations may cause interference to both downlink and uplink when two or more cells have different overlapping downlink and uplink subframes.

Figure 7:
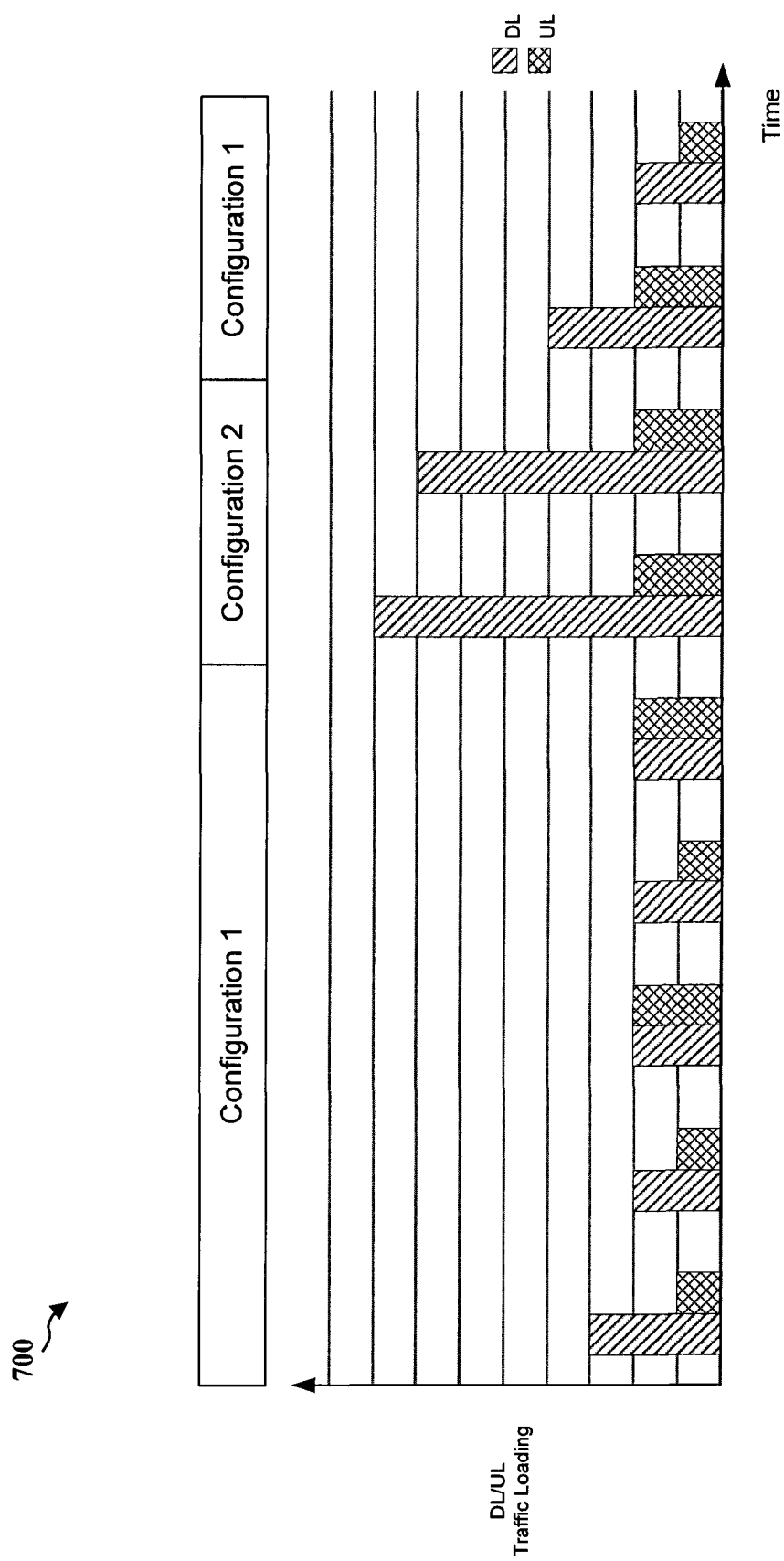
FIG. 7 is a diagram illustrating the application of flexible TDD DL/UL configurations for a cell.

FIG. 7 is a diagram 700 illustrating the application of flexible TDD DL/UL configurations for a cell (e.g., a pico cell or a macro cell). In FIG. 7, the vertical axis represents DL/UL traffic loading and the horizontal axis represents time. As shown in FIG. 7, the TDD DL/UL configuration applied to a cell may be changed at various times. For example, with reference to FIG. 7, configuration 1 may initially be applied to accommodate low DL traffic loads and configuration 2 may subsequently be applied to accommodate high DL traffic loads. For example, configuration 2 may be a DL heavy TDD configuration.

Figure 8:
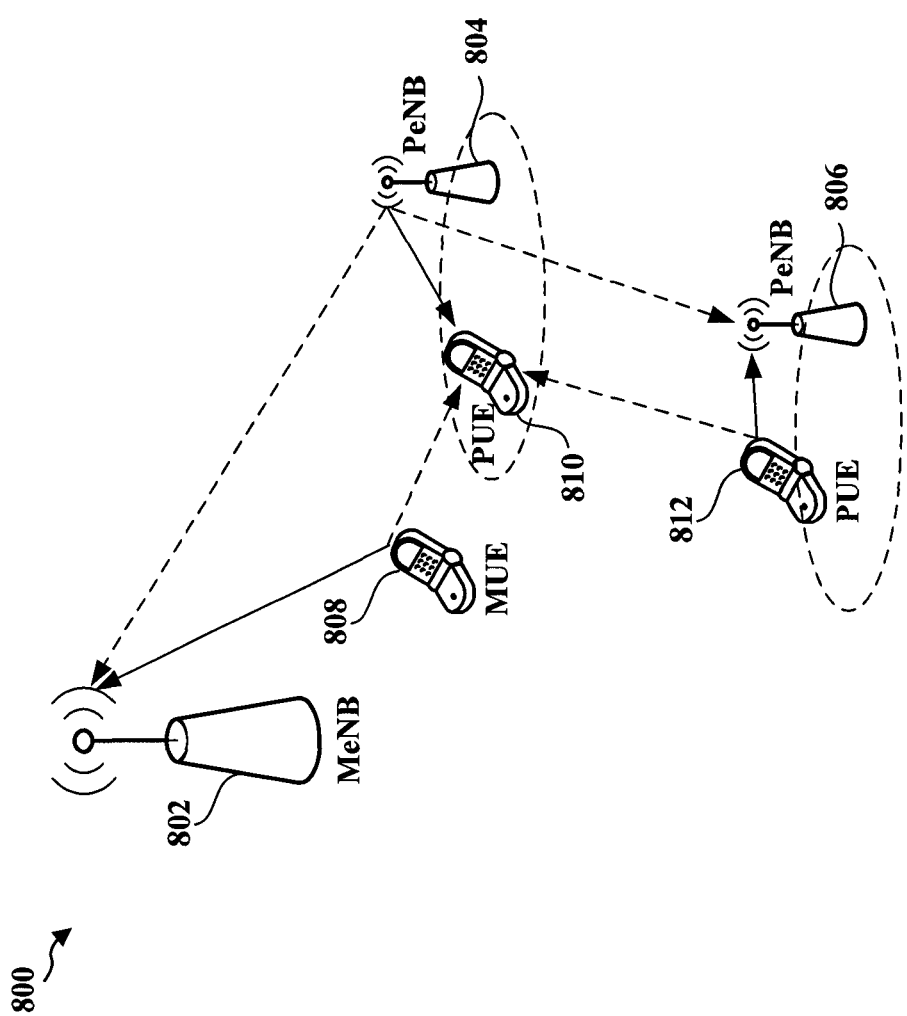
FIG. 8 is a diagram illustrating interference that may result due to the application of dynamic TDD DL/UL configurations.

FIG. 8 is a diagram 800 illustrating interference that may result due to the application of dynamic TDD DL/UL configurations. As shown in FIG. 8, the macro UE (MUE) 808 is in communication with the macro eNB (MeNB) 802, the pico UE (PUE) 810 is in communication with the pico eNB (PeNB) 804, and the PUE 812 is in communication with the PeNB 806. In FIG. 8, the solid lines indicate desired signals and the dashed lines indicate interference signals. For example, when the PeNB 804 sends a signal to the PUE 810, the signal sent to the PUE 810 may cause interference to the MeNB 802 and the PeNB 806. As another example, when the MUE 808 sends a signal to the MeNB 802, the signal sent to the MeNB 802 may cause interference to the PUE 810.

TDD UL/DL configurations of nodes (e.g., macro cells and/or pico cells) may be reconfigured to better match different UL/DL traffic loads of the nodes. However, such reconfiguration may require UL-DL interference management. One approach for mitigating UL-DL interference is a cell clustering method where eNBs that have a coupling loss below a threshold are forced to transmit using the same TDD configuration, for example. In outdoor pico cell to outdoor pico cell scenarios, the pico cells are grouped as a cell cluster if the coupling loss between two pico cells is less than a predefined threshold "X". The pico cells within such a cell cluster are configured to have the same transmit direction within a subframe. In outdoor pico cell to macro cell scenarios, pico cells are grouped as a cell cluster if the coupling loss between two pico cells is less than a predefined threshold "X". The pico cells within such a cell cluster are configured to have the same transmit direction within a subframe. If the coupling loss between any pico cell of the cell cluster and any macro cell is less than a predefined threshold "Y", all pico cells of the cell cluster are associated with the transmit direction of the macro cell.

Figure 9:
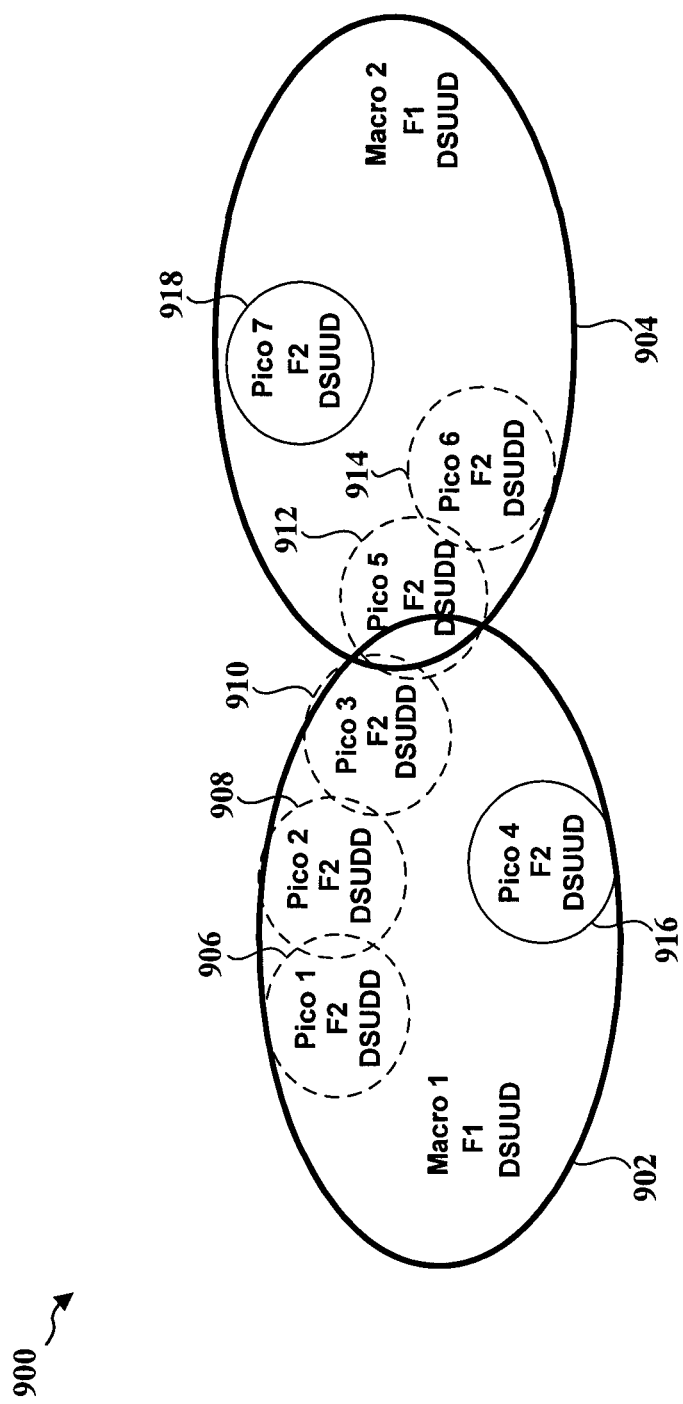
FIG. 9 is a diagram illustrating the mitigation of interference in a network.

FIG. 9 is a diagram 900 illustrating the mitigation of interference in a network at the cost of TDD UL/DL configuration flexibility. FIG. 9 includes macro cell coverage area 902 of macro cell 1, macro cell coverage area 904 of macro cell 2, and pico cell coverage areas 906, 908, 910, 916, 912, 914, and 918 of respective pico cells 1, 2, 3, 4, 5, 6, and 7. In the configuration of FIG. 9, pico cells 1, 2, 3, 5, and 6 (i.e., the cells with dashed borders) are in the same cell cluster. As shown in FIG. 9, macro cells 1 and 2 and pico cells 4 and 7 are configured with a "DSUUD" TDD configuration, and pico cells 1, 2, 3, 5, and 6 are configured with a "DSUDD" TDD configuration.

In the configuration of FIG. 9, the interference may be mitigated at the cost of UL/DL configuration flexibility. That is, when cells in the same cell cluster are configured to have the same UL/DL transmit direction, interference is mitigated. However, aligning the UL/DL direction of subframes among cells reduces the ability of individual cells to adapt to changing UL/DL demands within that individual cell. For example, if the threshold between pico cells is 90 dB and the threshold between pico cells and macro cells is 70 dB, then for pico cells 1, 2, 3, 5, and 6 to be in the same cell cluster, the coupling loss between pico cells 1, 2, 3, 5, and 6 would have to be below 90 db. Similarly, for macro cell 1 and pico cell 4 to be in the same cluster, the coupling loss between them would have to be less than 70 db. By adjusting the isolation thresholds, it is possible to increase or decrease configuration flexibility among cells in exchange for increase or decrease in the interference between cells, respectively.

An isolation threshold (also referred to as "IoT") may be determined based on an acceptable isolation threshold value. For example, the isolation threshold contributed by eNB-eNB interference may be determined by the following expression:

$$(P_{tx} \times \text{coupling\_loss})/(\text{thermal\_noise})$$

where Ptx represents the transmission power of an interfering eNB, coupling_loss represents a value based on the path-loss, antenna gain, and/or shadowing loss between an interfered eNB and an interfering eNB, and thermal_noise represents the thermal noise at the interfered eNB. Therefore, if an acceptable isolation threshold value is represented as IoT_a, then the isolation threshold may be set to a value determined by the following expression:

$$(\text{IoT\_a} \times \text{thermal\_noise})/(P_{tx}).$$

Figure 10:
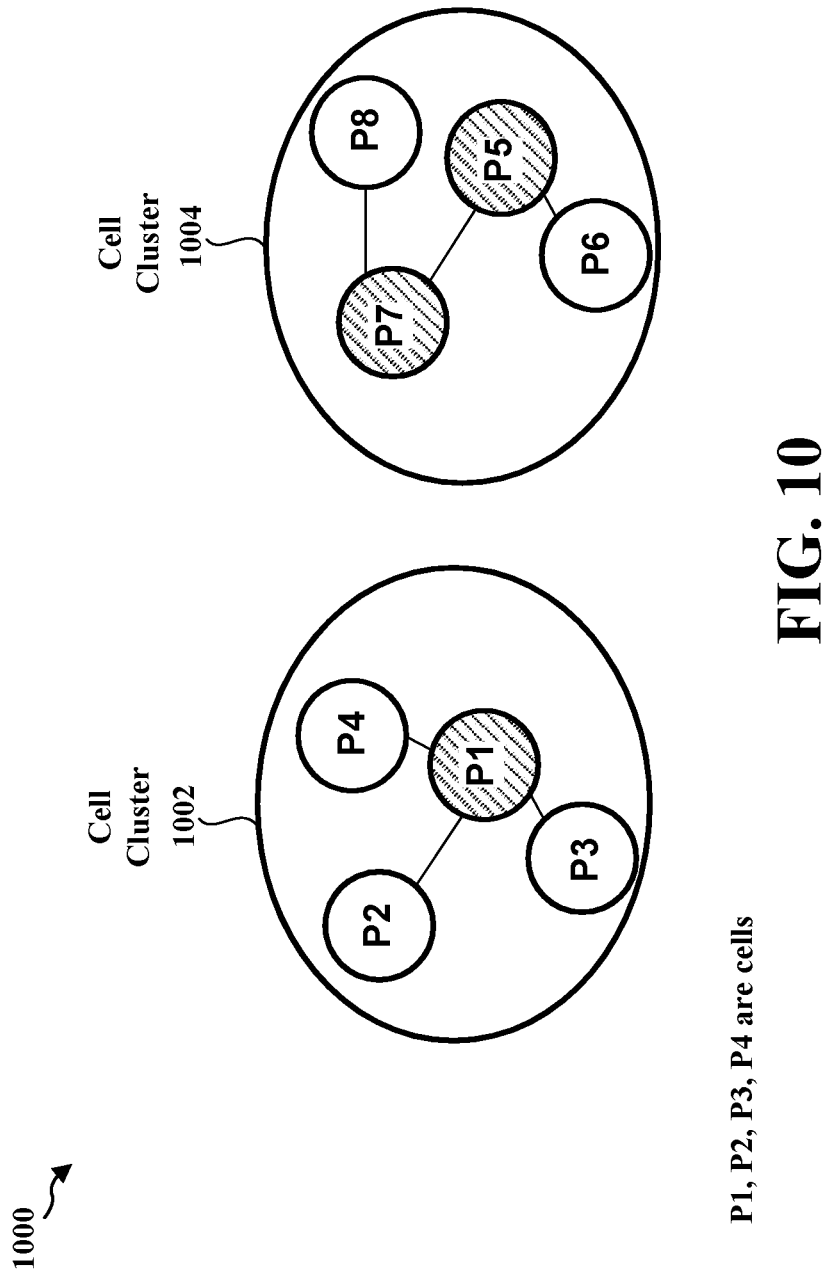
FIG. 10 is a diagram including cell clusters.

FIG. 10 is a diagram 1000 including cell clusters 1002 and 1004. As shown in FIG. 10, cell cluster 1002 includes cells P1, P2, P3, and P4. For example, cells P1, P2, P3, and P4 may be included in the same cell cluster if each of the cells are below an isolation threshold, such as a coupling loss threshold with respect to neighboring cells. As further shown in FIG. 10, cell cluster 1004 includes cells P5, P6, P7, and P8. For example, cells P5, P6, P7, and P8 may be included in the same cell cluster if each of the cells are below an isolation threshold, such as a coupling loss threshold with respect to neighboring cells.

In cell cluster 1002, each of cells P1, P2, P3, and P4 may have a common TDD subframe configuration. Moreover, the coupling loss between one cell in cell cluster 1002 and at least another cell in cell cluster 1002 may be lower than a predefined threshold. In cell cluster 1004, each of cells P5, P6, P7, and P8 may have a common TDD subframe configuration. Moreover, the coupling loss between one cell in cell cluster 1004 and at least another cell in cell cluster 1004 may be lower than a predefined threshold. The coupling loss between cells may be measured and/or received by the network (e.g., an eNB) via feedback from the cells.

At least one separating cell may be identified in each of cell clusters 1002 and 1004. In one configuration, the separating cell(s) may be identified based at least on the coupling loss between the cells in a corresponding cell cluster. For example, the separating cell(s) may have a coupling loss with respect to other cells that is lower than a threshold. For example, in cell cluster 1002, the cell P1 may be identified as the separating cell. In cell cluster 1004, the cells P5 and P7 may be identified as the separating cells. A cell cluster (e.g., cell cluster 1002 or cell cluster 1004) may then be separated based on the separating cell(s) to form two or more cell clusters as shown in FIG. 11.

Figure 11:
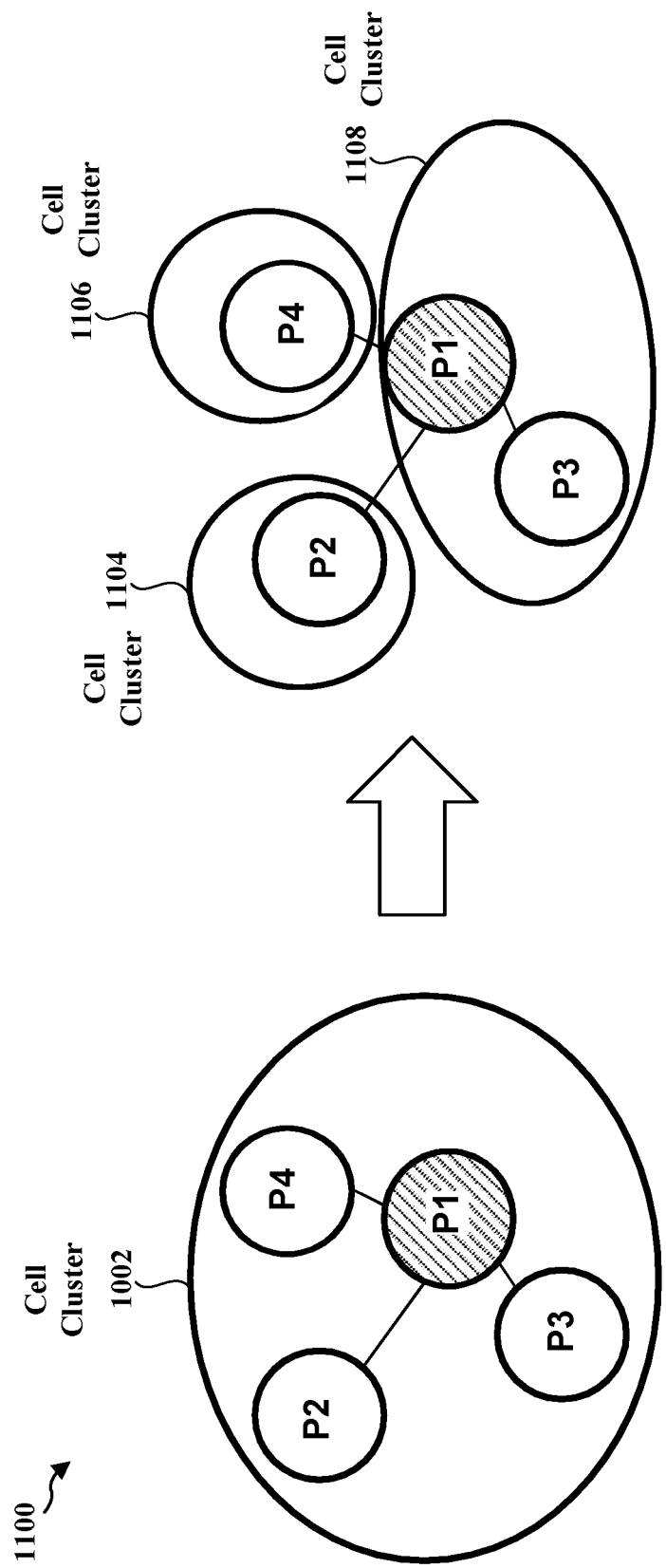
FIG. 11 is a diagram illustrating an exemplary separation of the cell cluster based on the separating cell.

FIG. 11 is a diagram 1100 illustrating an exemplary separation of the cell cluster 1002 based on the separating cell P1. As shown in FIG. 11, the separating cell P1 may be separated from cell cluster 1002 to form cell clusters 1104, 1106, and 1108. For example, cell cluster 1104 may include cell P2, cell cluster 1106 may include cell P4, and cell cluster 1108 may include separating cell P1 and cell P3. In one aspect, a first TDD subframe configuration may be set for the cell cluster 1104, a second TDD subframe configuration may be set for the cell cluster 1106, and a third TDD subframe configuration may be set for the cell cluster 1108. In one configuration, at least one of the first, second and third subframe configurations may be different to enable greater UL/DL flexibility for cells in their respective cell clusters (e.g., cell clusters 1104, 1106, and 1108).

Figure 12:
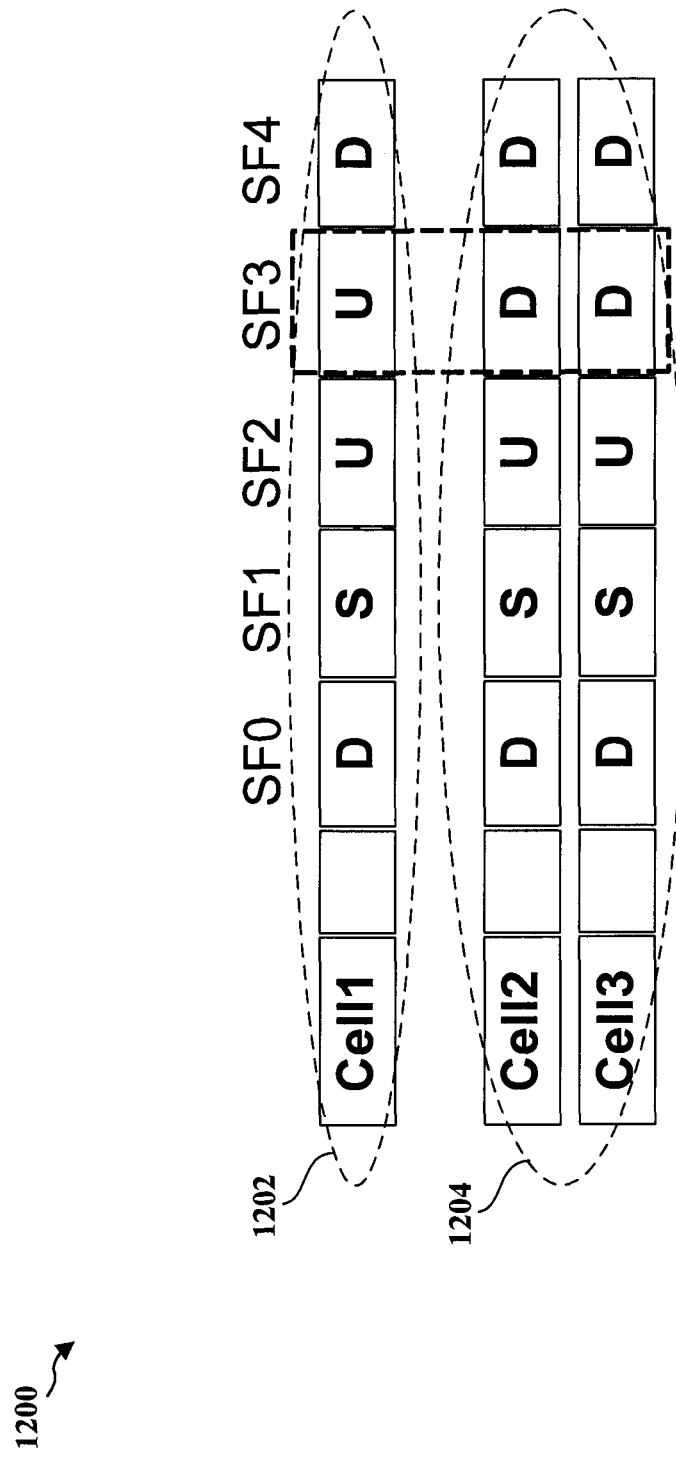
FIG. 12 is a diagram illustrating TDD subframe configurations of a first cell cluster and a second cell cluster.

FIG. 12 is a diagram 1200 illustrating TDD subframe configurations of a first cell cluster 1202 and a second cell cluster 1204. In the configuration of FIG. 12, the first cell cluster 1202 and the second cell cluster 1204 may be formed by identifying cell 2 as a separating cell in a cell cluster that includes cells 1, 2, and 3, and by separating cell 2 along with cell 3 from the cell cluster. Accordingly, the first cell cluster 1202 may include cell 1 and the second cell cluster 1204 may include cells 2 and 3. As shown in FIG. 12, the first cell cluster 1202 may be configured with a "DSUUD" TDD subframe configuration and the second cell cluster 1204 including the separating cell may be configured with a downlink heavy TDD subframe configuration which includes more downlink subframes than uplink subframes, such as a "DSUDD" TDD subframe configuration.

The subframes of cells 1, 2, and 3 in which downlink and uplink subframes coexist may be designated as non-anchor subframes, and subframes of cells 1, 2, and 3 in which downlink and uplink subframes do not coexist may be designated as anchor subframes. For example, with reference to FIG. 12, subframes (SFs) "SF0", "SF1", "SF2", and "SF4" may be designated as anchor subframes and subframe "SF3" may be designated as a non-anchor subframe.

In one configuration, in order to minimize the impact of interference on neighboring cells, downlink subframes of the non-anchor subframes (e.g., SF3) of the separating cell (e.g., cell 2) may be configured as almost blank subframes (ABSs). This approach reduces the interference from the separating cell on adjacent neighboring cells on subframes with different transmission directions.

Figure 13:
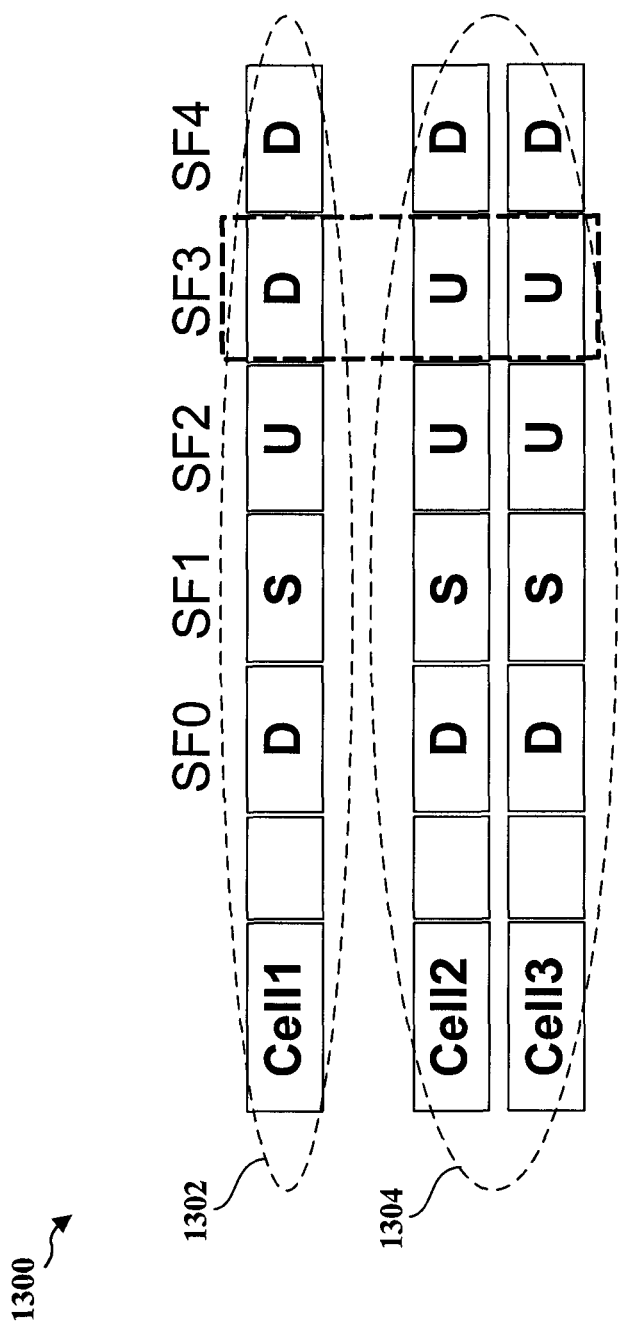
FIG. 13 is a diagram illustrating TDD subframe configurations of a first cell cluster and a second cell cluster.

FIG. 13 is a diagram 1300 illustrating TDD subframe configurations of a first cell cluster 1302 and a second cell cluster 1304. In the configuration of FIG. 13, the first cell cluster 1302 and the second cell cluster 1304 may be formed by identifying cell 2 as a separating cell in a cell cluster including cells 1, 2, and 3, and by separating cell 2 along with cell 3 from the cell cluster. Accordingly, the first cell cluster 1302 may include cell 1 and the second cell cluster 1304 may include cells 2 and 3. As shown in FIG. 13, the first cell cluster 1302 may be configured with a "DSUDD" TDD subframe configuration and the second cell cluster 1304 including the separating cell may be configured with an uplink heavy TDD subframe configuration which includes more uplink subframes than downlink subframes, such as a "DSUUD" TDD subframe configuration.

The subframes of cells 1, 2, and 3 in which downlink and uplink subframes coexist may be designated as non-anchor subframes, and subframes of cells 1, 2, and 3 in which downlink and uplink subframes do not coexist may be designated as anchor subframes. In one configuration, with reference to FIG. 13, in order to minimize the impact of interference on neighboring cells, an uplink acknowledgment may be shifted from an uplink subframe in a non-anchor subframe (e.g., SF3) of the separating cell (e.g., cell 2) to an uplink subframe in an anchor subframe of the separating cell. In another configuration, an uplink transmission may be scheduled only in an uplink subframe in the anchor subframe of the separating cell (e.g., cell 2). For example, the uplink acknowledgment may be shifted and/or scheduled via uplink control information (UCI). It should be understood that a control signal other than the previously discussed uplink acknowledgement signal may be shifted to an anchor subframe of the separating cell. In other configurations, a downlink control signal may be shifted to a downlink subframe of an anchor subframe of the separating cell.

Figure 14:
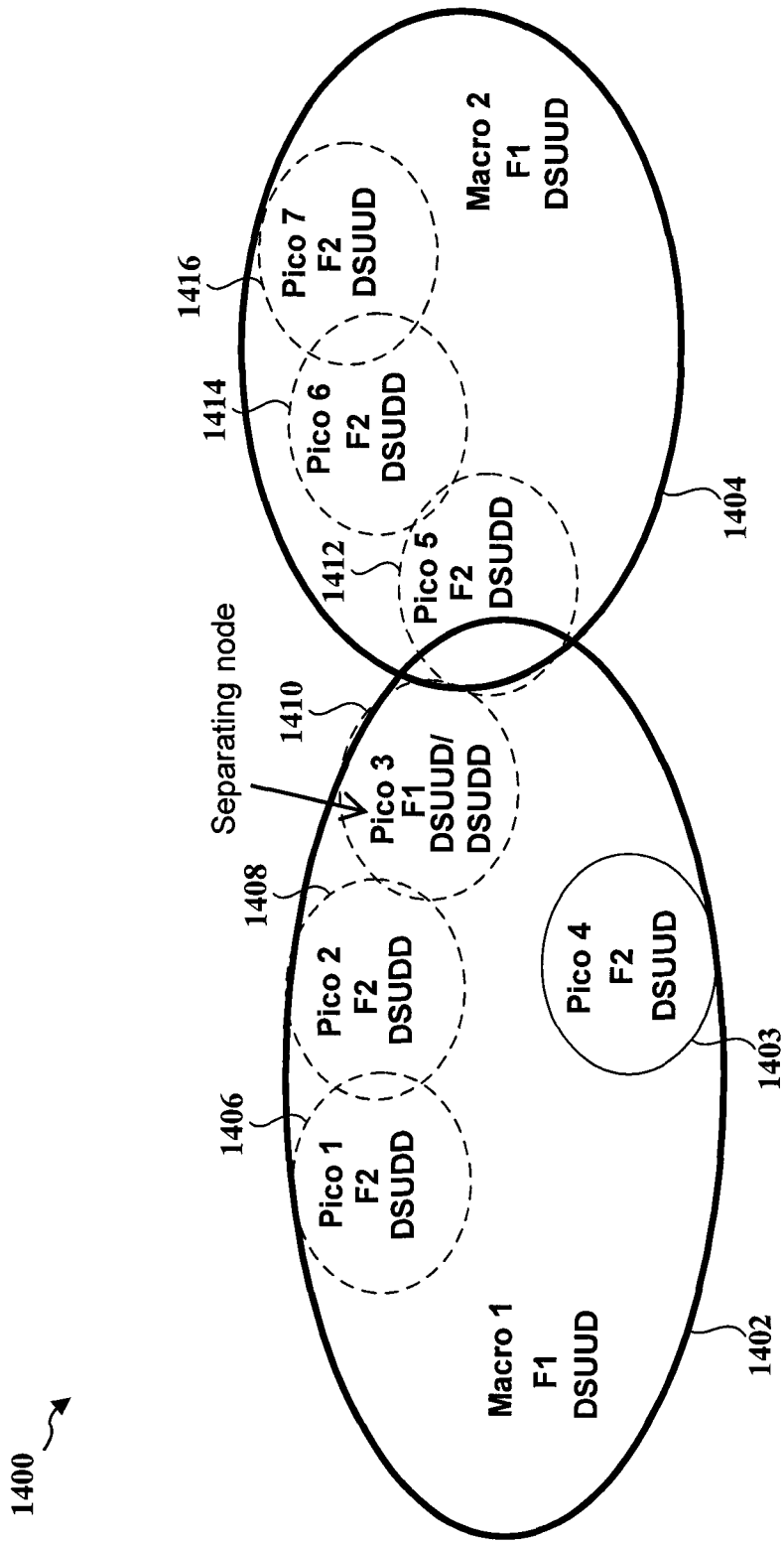
FIG. 14 is a diagram illustrating an exemplary separation of a cell cluster based on a separating cell.

FIG. 14 is a diagram 1400 illustrating an exemplary separation of a cell cluster based on a separating cell. FIG. 14 includes macro cell coverage area 1402 of macro cell 1, macro cell coverage area 1404 of macro cell 2, and pico cell coverage areas 1406, 1408, 1410, 1403, 1412, 1414, and 1416 of respective pico cells 1, 2, 3, 4, 5, 6, and 7. In the configuration of FIG. 14, pico cells 1, 2, 3, 5, and 6 belong to the same cell cluster. As shown in FIG. 14, macro cells 1 and 2 may communicate on carrier "F1" and may be configured with a "DSUUD" TDD subframe configuration, and pico cells 1, 2, 3, 5, and 6 may communicate on carrier "F2" and may be configured with a "DSUDD" TDD subframe configuration.

In the configuration of FIG. 14, pico cell 3 may be identified as the separating cell in the cell cluster including pico cells 1, 2, 3, 5, and 6. If the coupling loss between the separating cell (e.g., pico cell 3) and the macro cell (e.g., macro cell 1) is higher than a threshold, the carrier of the separating cell may be switched so that the separating cell may communicate on a channel adjacent to the channel used by the remaining cells in the cell cluster (e.g., pico cells 1, 2, 5, and 6). For example, the carrier of the separating cell (e.g., pico cell 3) may be switched from "F2" to "F1" as shown in FIG. 14. As further shown in FIG. 14, the TDD subframe configuration of the separating cell may be changed for greater TDD subframe configuration flexibility. For example, the TDD subframe configuration of the separating cell may be changed from "DSUDD" to "DSUUD".

In one aspect, a separating cell may be identified in a cell cluster based at least on the coupling loss between the cells in a corresponding cell cluster. For example, the separating cell(s) may have a coupling loss with respect to other cells that is higher than a threshold. For example, the separating cell may be separated from the cell cluster to form a first cell cluster and a second cell cluster. A first TDD subframe configuration may be set for the cell(s) in the first cell cluster and a second TDD subframe configuration may be set for the cell(s) in the second cell cluster. In one configuration, the separating cell may be muted to enable greater UL/DL flexibility. For example, one or more uplink transmissions may not be scheduled in one or more uplink subframes of the separating cell and/or no transmissions may be performed in one or more downlink subframes of the separating cell.

Figure 15:
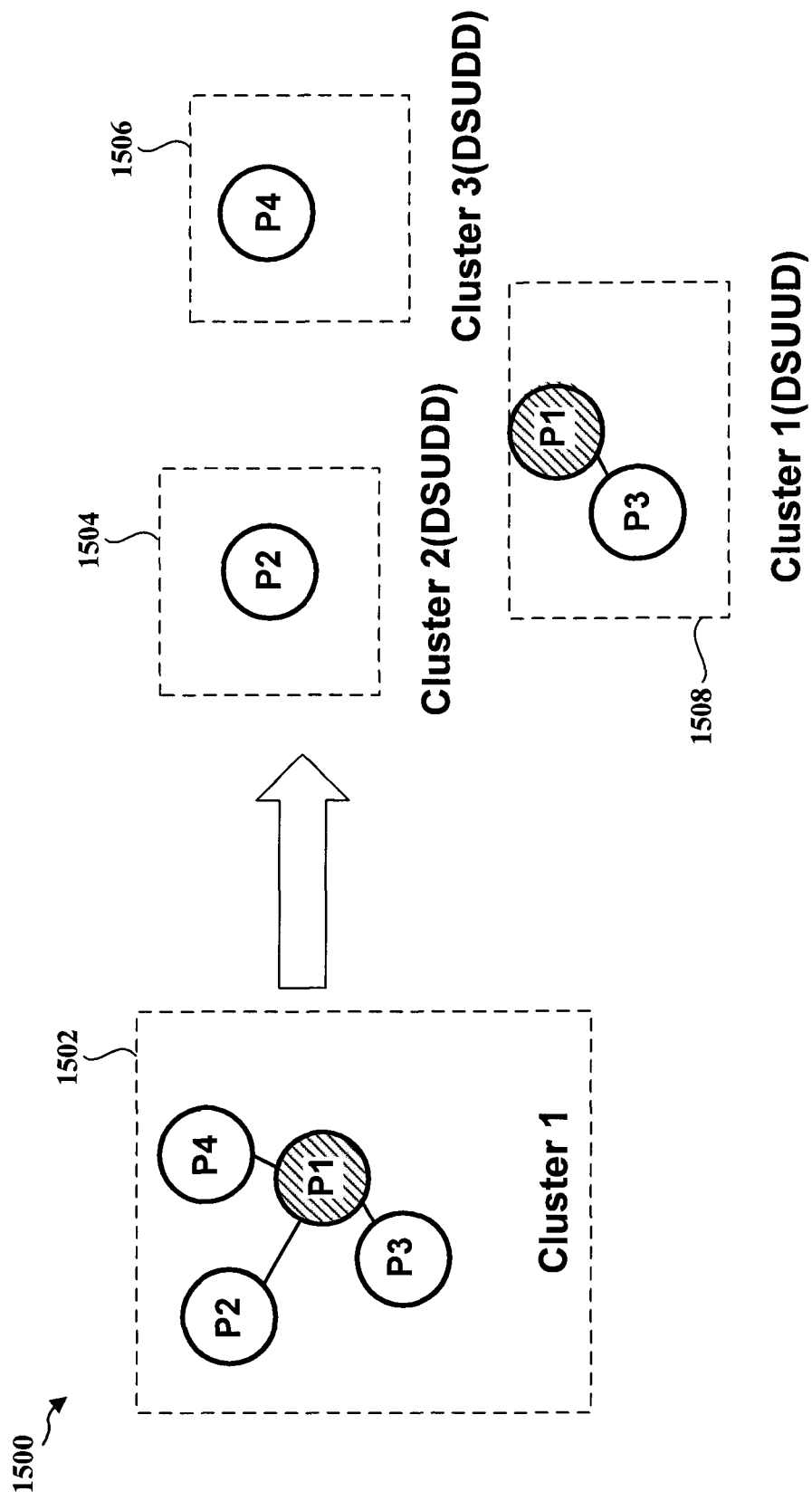
FIG. 15 is a diagram illustrating the separation of a cell cluster.

FIG. 15 is a diagram 1500 illustrating the separation of a cell cluster. As shown in FIG. 15, cell cluster 1502 includes cells P1, P2, P3, and P4. For example, cells P1, P2, P3, and P4 may be pico cells configured to communicate using the same carrier. In the configuration of FIG. 15, cell P1 may be identified as the separating cell. As shown in FIG. 15, the separating cell (e.g., cell P1) may be separated from the cell cluster 1502 to form cell cluster 1508 that includes the separating cell P1 and cell P3, cell cluster 1504 that includes cell P2, and cell cluster 1506 that includes cell P4. As shown in FIG. 15, the cell cluster 1508 including the separating cell P1 may be configured to have an uplink heavy TDD configuration, such as a "DSUUD" TDD configuration, and the cell clusters 1504 and 1506 may be configured to have a "DSUDD" TDD configuration. In the configuration of FIG. 15, cell clusters 1504, 1506, and 1508 may communicate using the same carrier. In one configuration, in order to minimize the impact of interference on neighboring cells, an uplink acknowledgment may be shifted to an uplink subframe in an anchor subframe of the cell cluster 1508 including the separating cell as described supra. In another configuration, an uplink transmission may be scheduled only in an uplink subframe in an anchor subframe of the cell cluster 1508 including the separating cell as described supra. For example, the uplink acknowledgment may be shifted and/or scheduled via UCI.

Figure 16:
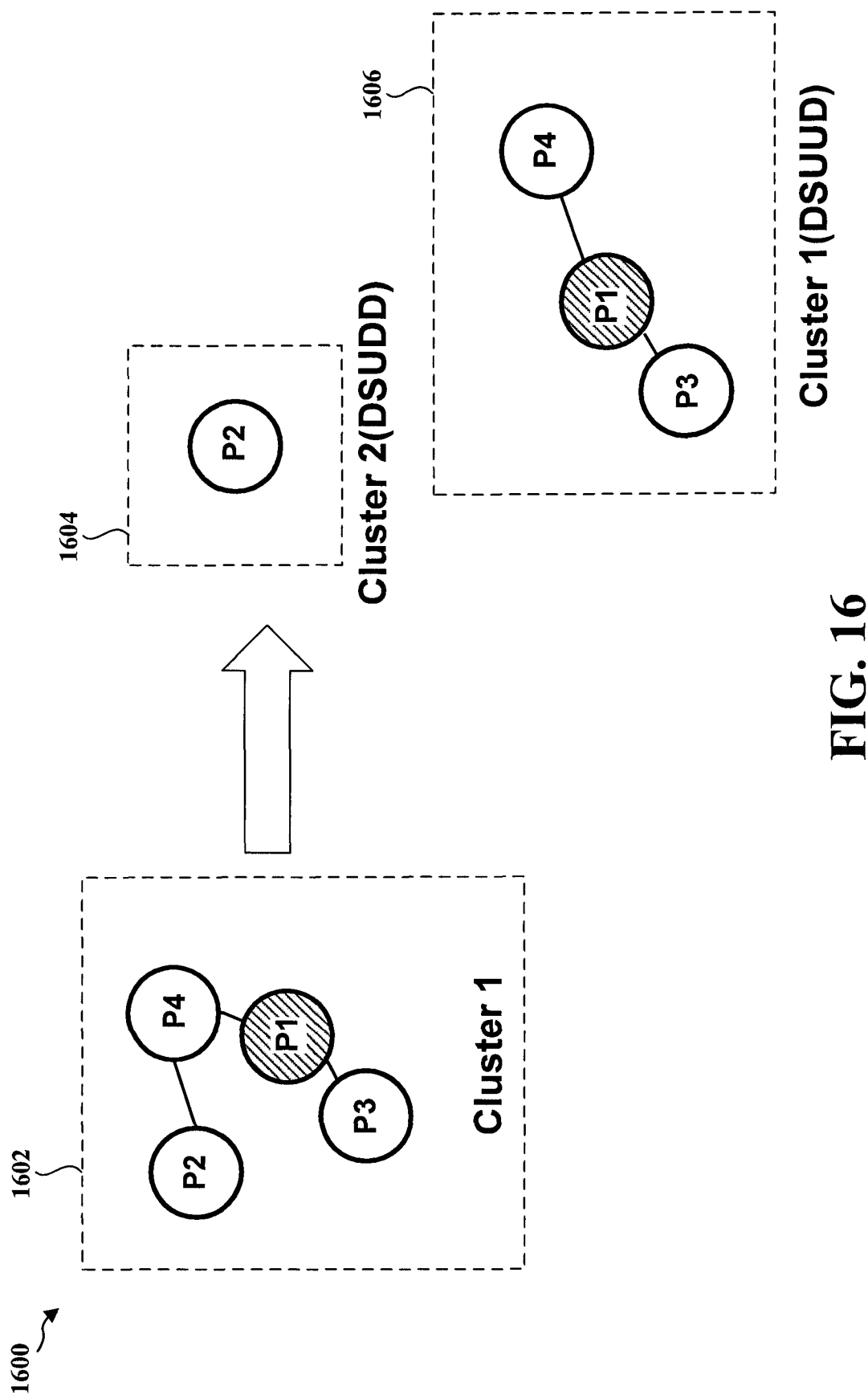
FIG. 16 is a diagram illustrating the separation of a cell cluster.

FIG. 16 is a diagram 1600 illustrating the separation of a cell cluster. As shown in FIG. 16, cell cluster 1602 includes cells P1, P2, P3, and P4. For example, cell P1 may be a macro cell and cells P2, P3, and P4 may be pico cells. In cell cluster 1602, cell P1 may be configured to communicate using a first carrier and cells P2, P3, and P4 may be configured to communicate using a second carrier. In the configuration of FIG. 16, cell P1 may be identified as the separating cell based at least on the coupling loss between the cells in a corresponding cell cluster. For example, the separating cell P1 may have a coupling loss with respect to other cells that is lower than a threshold.

As shown in FIG. 16, the separating cell (e.g., cell P1) may be separated from the cell cluster 1602 to form cell cluster 1604 that includes cell P2, and cell cluster 1606 that includes the separating cell P1 and cells P3 and P4. As shown in FIG. 16, the cell cluster 1606 including the separating cell P1 and cells P3 and P4 may be configured to have a same TDD subframe configuration, such as a "DSUUD" TDD subframe configuration, and the cell cluster 1604 including cell P2 may be configured to have a "DSUDD" TDD subframe configuration. Cells P1, P3, and P4 may be treated as one cell. In one configuration, the carrier of cells P3 and/or P4 may be switched, such that cells P3 and/or P4 communicate using the same carrier (e.g., the first carrier) as the separating cell P1. In one configuration, cell P4 may be configured to a have a configuration different from separating cell P1 and cell P3.

Figure 17:
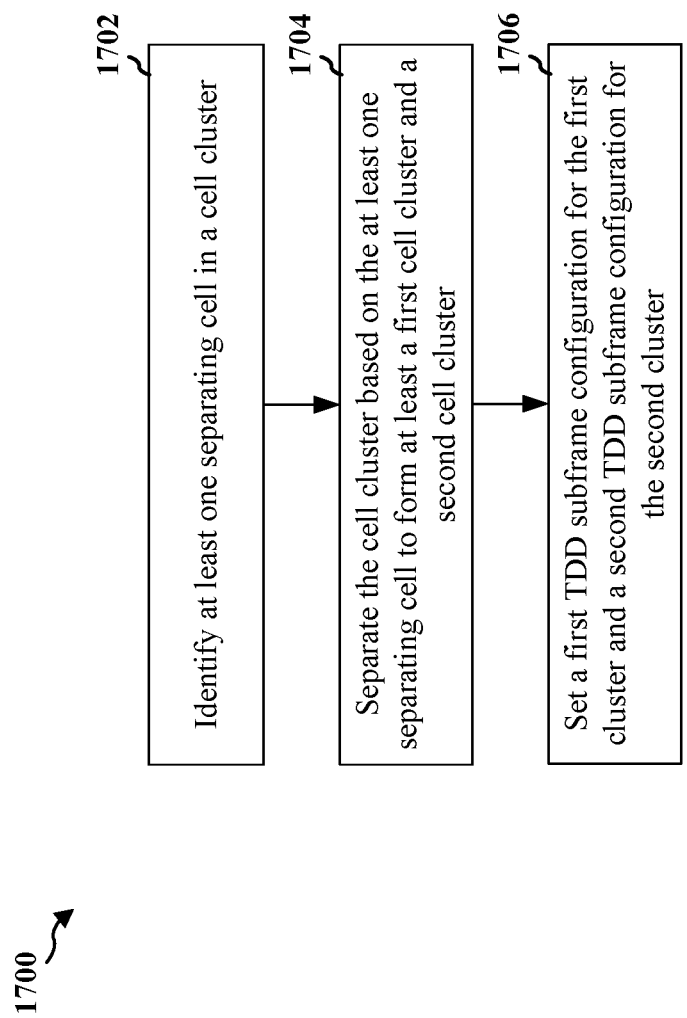
FIG. 17 is a flowchart of a method of wireless communication.

FIG. 17 is a flowchart 1700 of a method of wireless communication. The method may be performed by an eNB. At step 1702, the eNB may identify at least one separating cell in a cell cluster. The cell cluster may be at least two cells having a common TDD subframe configuration, where a coupling loss between one cell in the cell cluster and at least another cell in the cell cluster is lower than a predefined threshold. In one configuration, the at least one separating cell may be identified based on a coupling loss between cells in the cluster of cells and where separation of the separating cell from the cell cluster divides the cell cluster to at least a first cell cluster and a second cell cluster. For example, the separating cell(s) may have a coupling loss with respect to other cells that is lower than a threshold.

For example, with reference to FIG. 11, cell cluster 1002 includes cells P1, P2, P3, and P4. In cell cluster 1002, each of cells P1, P2, P3, and P4 may have a common TDD subframe configuration. Moreover, the coupling loss between one cell in cell cluster 1002 and at least another cell in cell cluster 1002 may be lower than a predefined threshold. For example, at least one separating cell may be identified in cell cluster 1002. In one configuration, the separating cell(s) may be identified based at least on the coupling loss between the cells in a corresponding cell cluster. For example, in cell cluster 1002, the cell P1 may be identified as the separating cell when a coupling loss of the cell P1 with respect to other cells is lower than a threshold.

At step 1704, the eNB may separate the cell cluster based on the at least one separating cell to form at least a first cell cluster and a second cell cluster. For example, with reference to FIG. 11, the separating cell P1 may be separated from cell cluster 1002 to form cell clusters 1104, 1106, and 1108. For example, cell cluster 1104 may include cell P2, cell cluster 1106 may include cell P4, and cell cluster 1108 may include separating cell P1 and cell P3.

At step 1706, the eNB may set a first TDD subframe configuration for the first cell cluster and a second TDD subframe configuration for the second cell cluster. For example, with reference to FIG. 11, a first TDD subframe configuration may be set for the cell cluster 1104, a second TDD subframe configuration may be set for the cell cluster 1106, and a third TDD subframe configuration may be set for the cell cluster 1108. In one configuration, at least one of the first, second and third TDD subframe configurations may be different to enable greater UL/DL flexibility for cells in their respective cell clusters (e.g., cell clusters 1104, 1106, and 1108). For example, the first and second TDD subframe configurations may be "DSUDD" TDD subframe configurations and the third TDD subframe configuration may be a "DSUUD" TDD subframe configuration.

Figure 18:
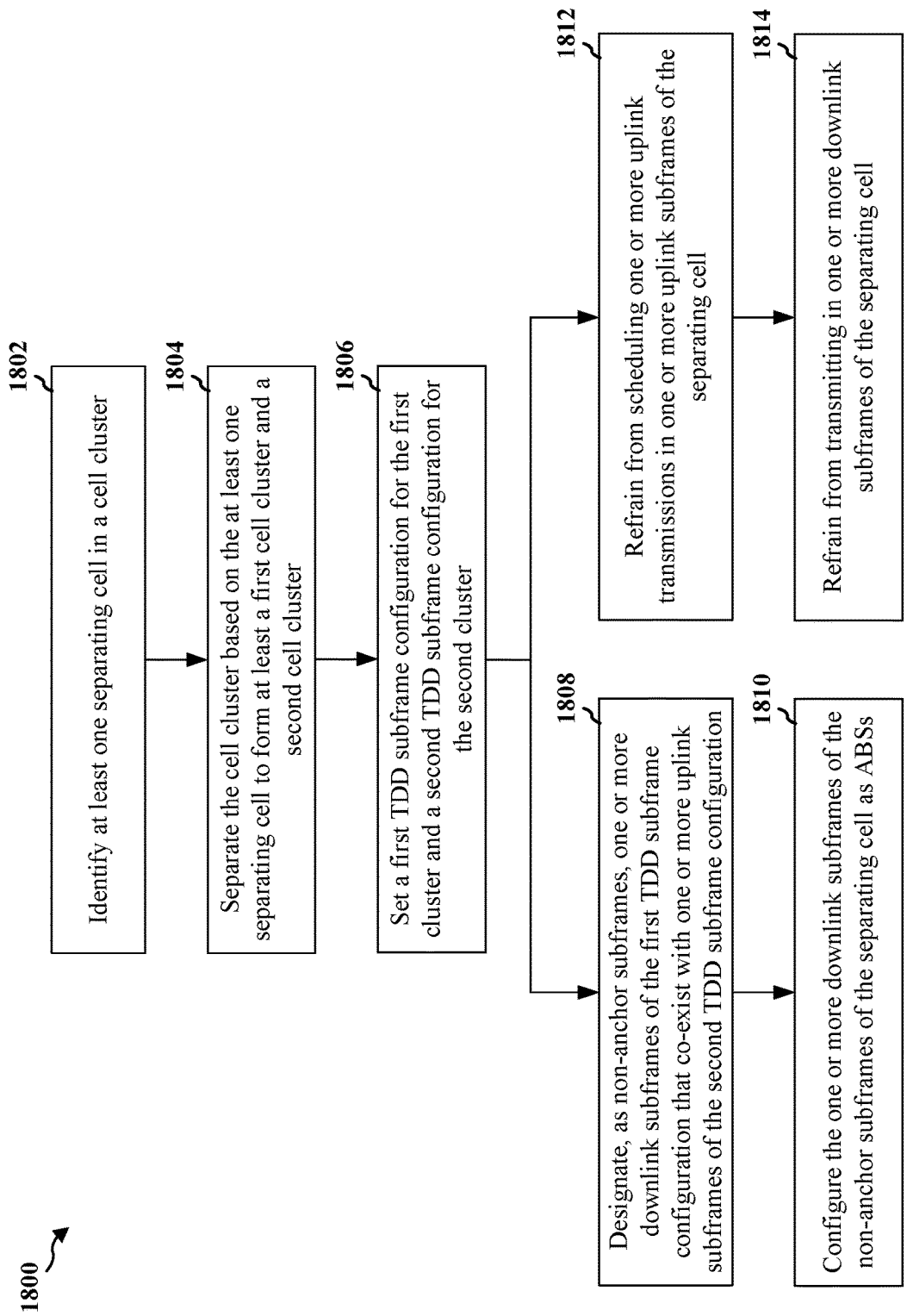
FIG. 18 is a flowchart of a method of wireless communication.

FIG. 18 is a flowchart 1800 of a method of wireless communication. The method may be performed by an eNB. At step 1802, the eNB may identify at least one separating cell in a cell cluster. The cell cluster may be at least two cells having a common TDD subframe configuration, where a coupling loss between one cell in the cell cluster and at least another cell in the cell cluster is lower than a predefined threshold. In one configuration, the at least one separating cell may be identified based on a coupling loss between cells in the cluster of cells and where separation of the separating cell from the cell cluster divides the cell cluster to at least a first cell cluster and a second cell cluster. For example, the separating cell(s) may have a coupling loss with respect to other cells that is lower than a threshold. For example, with reference to FIG. 12, cell 2 may be identified as a separating cell in a cell cluster that includes cells 1, 2, and 3, where the coupling loss of cell 2 with respect to cells 1 and 3 is below a threshold.

At step 1804, the eNB may separate the cell cluster based on the at least one separating cell to form at least a first cell cluster and a second cell cluster. For example, cell 2 may be separated from the cell cluster including cells 1, 2, and 3 to form the first cell cluster 1202 including cell 1 and the second cell cluster 1204 including cells 2 and 3.

At step 1806, the eNB may set a first TDD subframe configuration for the first cell cluster and a second TDD subframe configuration for the second cell cluster. In one configuration, the TDD subframe configuration of the separating cell may include more downlink subframes than uplink subframes. For example, with reference to FIG. 12, the first cell cluster 1202 may be configured with a "DSUUD" TDD subframe configuration and the second cell cluster 1204 including the separating cell (e.g., cell 2) may be configured with a downlink heavy TDD subframe configuration, such as a "DSUDD" TDD subframe configuration.

At step 1808, the eNB may designate, as non-anchor subframes, one or more downlink subframes of the first TDD subframe configuration that co-exist with one or more uplink subframes of the second TDD subframe configuration. For example, with reference to FIG. 12, the subframes of cells 1-3 in which downlink and uplink subframes coexist may be designated as non-anchor subframes, and subframes of cells 1-3 in which downlink and uplink subframes do not coexist may be designated as anchor subframes. For example, subframes (SFs) "SF0", "SF1", "SF2", and "SF4" may be designated as anchor subframes and subframe "SF3" may be designated as a non-anchor subframe.

At step 1810, the eNB may configure the one or more downlink subframes of the non-anchor subframes of the separating cell as ABSs. For example, with reference to FIG. 12, downlink subframes of the non-anchor subframes (e.g., SF3) of the separating cell (e.g., cell 2) may be configured as ABSs.

At step 1812, the eNB may refrain from scheduling one or more uplink transmissions in one or more uplink subframes of the separating cell. At step 1814, the eNB may refrain from transmitting in one or more downlink subframes of the separating cell.

Figure 19:
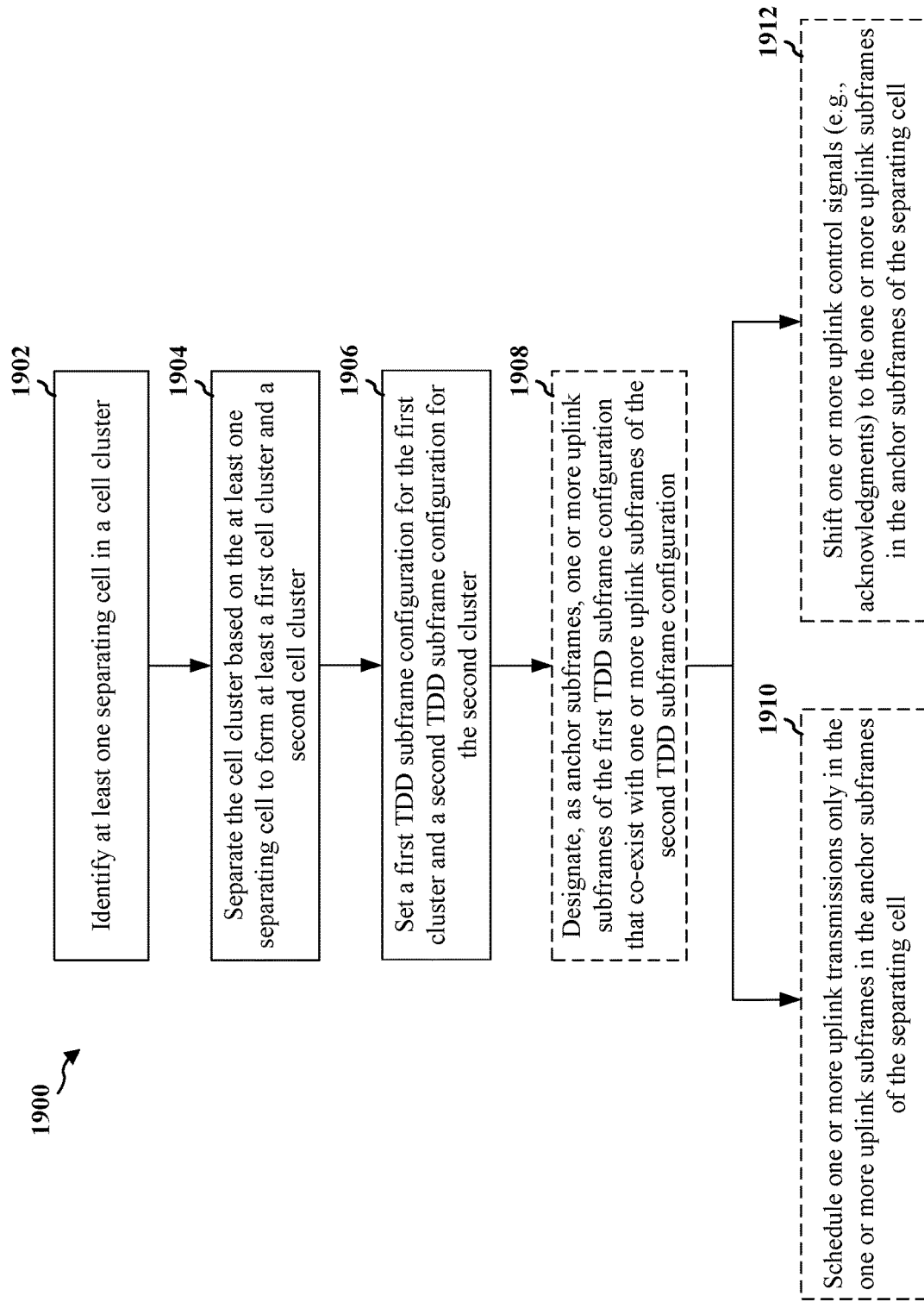
FIG. 19 is a flowchart of a method of wireless communication.

FIG. 19 is a flowchart 1900 of a method of wireless communication. The method may be performed by an eNB. At step 1902, the eNB may identify at least one separating cell in a cell cluster. The cell cluster may be at least two cells having a common TDD subframe configuration, where a coupling loss between one cell in the cell cluster and at least another cell in the cell cluster is lower than a predefined threshold. In one configuration, the at least one separating cell may be identified based on a coupling loss between cells in the cluster of cells and where separation of the separating cell from the cell cluster divides the cell cluster to at least a first cell cluster and a second cell cluster. For example, the separating cell(s) may have a coupling loss with respect to other cells that is lower than a threshold.

For example, with reference to FIG. 13, cell 2 may be identified as a separating cell in a cell cluster that includes cells 1, 2, and 3, where the coupling loss of cell 2 with respect to cells 1 and 3 is below a threshold.

At step 1904, the eNB may separate the cell cluster based on the at least one separating cell to form at least a first cell cluster and a second cell cluster. For example, cell 2 may be separated from the cell cluster including cells 1, 2, and 3 to form the first cell cluster 1302 including cell 1 and the second cell cluster 1304 including cells 2 and 3.

At step 1906, the eNB may set a first TDD subframe configuration for the first cell cluster and a second TDD subframe configuration for the second cell cluster. In one configuration, the TDD subframe configuration of the separating cell may include more uplink subframes than downlink subframes. For example, with reference to FIG. 13, first cell cluster 1302 may be configured with a "DSUDD" TDD configuration and the second cell cluster 1304 including the separating cell may be configured with an uplink heavy TDD subframe configuration, such as a "DSUUD" TDD subframe configuration.

At step 1908, the eNB may designate, as anchor subframes, one or more uplink subframes of the first TDD subframe configuration that co-exist with one or more uplink subframes of the second TDD subframe configuration. For example, with reference to FIG. 13, the subframes of cells 1-3 in which uplink subframes coexist may be designated as anchor subframes, and subframes of cells 1-3 in which downlink and uplink subframes coexist may be designated as non-anchor subframes. For example, subframes (SFs) "SF0", "SF1", "SF2", and "SF4" may be designated as anchor subframes and subframe "SF3" may be designated as a non-anchor subframe.

At step 1910, the eNB may schedule one or more uplink transmissions only in the one or more uplink subframes in the anchor subframes of the separating cell. For example, the uplink acknowledgment may be scheduled via UCI.

At step 1912, the eNB may shift one or more uplink control signals (e.g., acknowledgments) to the one or more uplink subframes in the anchor subframes of separating cell. For example, the uplink acknowledgment may be shifted via UCI.

Figure 20:
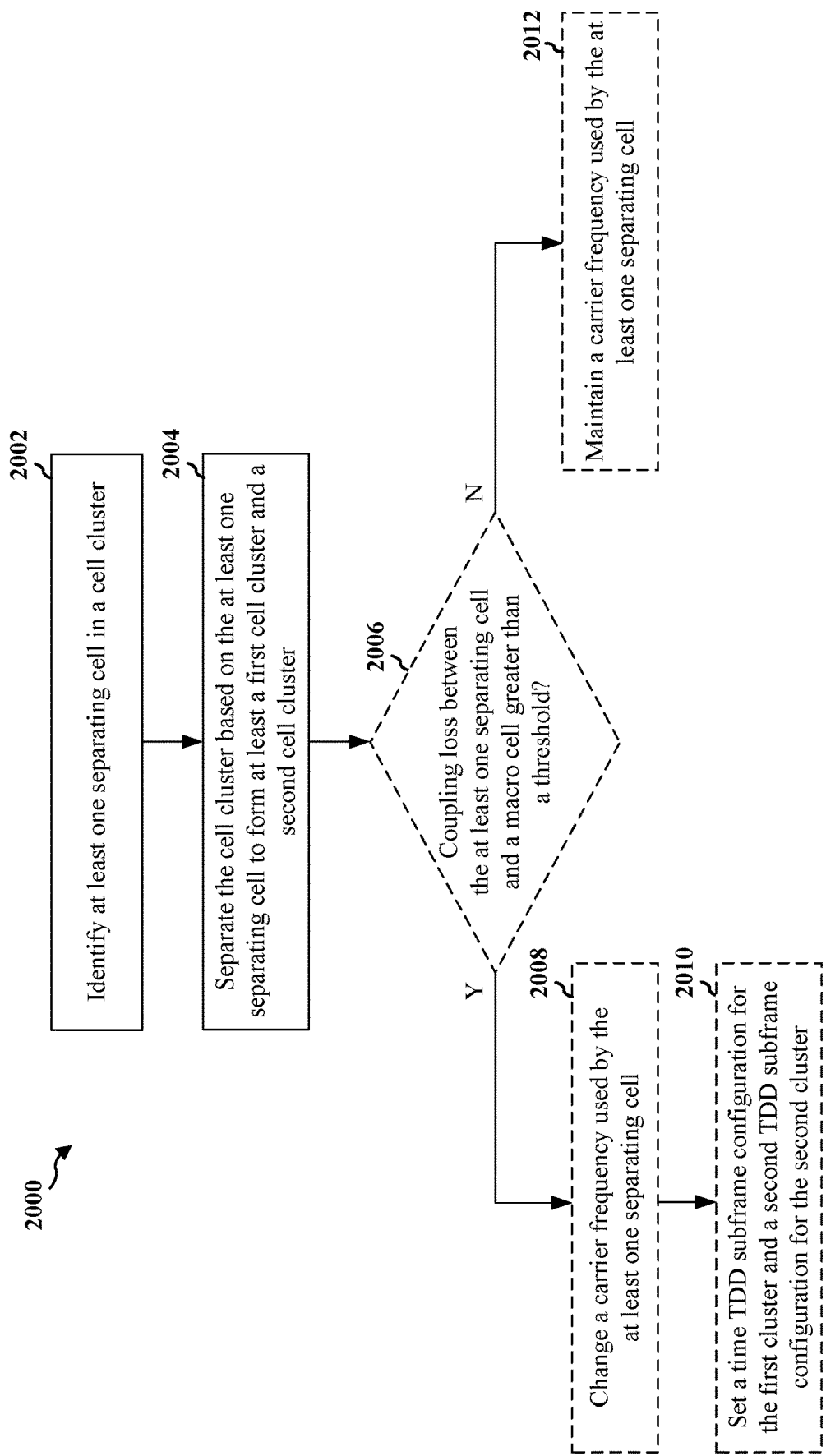
FIG. 20 is a flowchart of a method of wireless communication.

FIG. 20 is a flowchart 2000 of a method of wireless communication. The method may be performed by an eNB. At step 2002, the eNB may identify at least one separating cell in a cell cluster. The cell cluster may be at least two cells having a common TDD subframe configuration, where a coupling loss between one cell in the cell cluster and at least another cell in the cell cluster is lower than a predefined threshold. In one configuration, the at least one separating cell may be identified based on a coupling loss between cells in the cluster of cells and where separation of the separating cell from the cell cluster divides the cell cluster to at least a first cell cluster and a second cell cluster. For example, with reference to FIG. 14, pico cell 3 may be identified as the separating cell in the cell cluster including pico cells 1, 2, 3, 5, and 6.

At step 2004, the eNB may separate the cell cluster based on the at least one separating cell to form at least a first cell cluster and a second cell cluster. For example, with reference to FIG. 14, the separating cell (e.g., pico cell 3) may be in a first cell cluster and pico cells 1, 2, 5, and 6 may be in a second cell cluster.

At step 2006, the eNB may determine whether the coupling loss between the at least one separating cell and a macro cell is greater than a threshold. The coupling loss between the at least one separating cell and a macro cell may be measured and/or received by the network (e.g., an eNB) via feedback from the cells.

At step 2008, the eNB may change a carrier frequency used by the at least one separating cell when the coupling loss between the at least one separating cell and the macro cell is greater than the threshold. For example, with reference to FIG. 14, the carrier of the separating cell (e.g., pico cell 3) may be changed from "F2" to "F1".

At step 2010, the eNB may set a first TDD subframe configuration for the first cell cluster and a second TDD subframe configuration for the second cell cluster. For example, with reference to FIG. 14, pico cells 1, 2, 5, and 6 may be configured with a "DSUDD" TDD subframe configuration and the separating cell (e.g., pico cell 3) may be configured with a "DSUUD" TDD subframe configuration.

At step 2012, the eNB may maintain a carrier frequency used by the at least one separating cell if the coupling loss between the at least one separating cell and the macro cell is not greater than the threshold.

Figure 21:
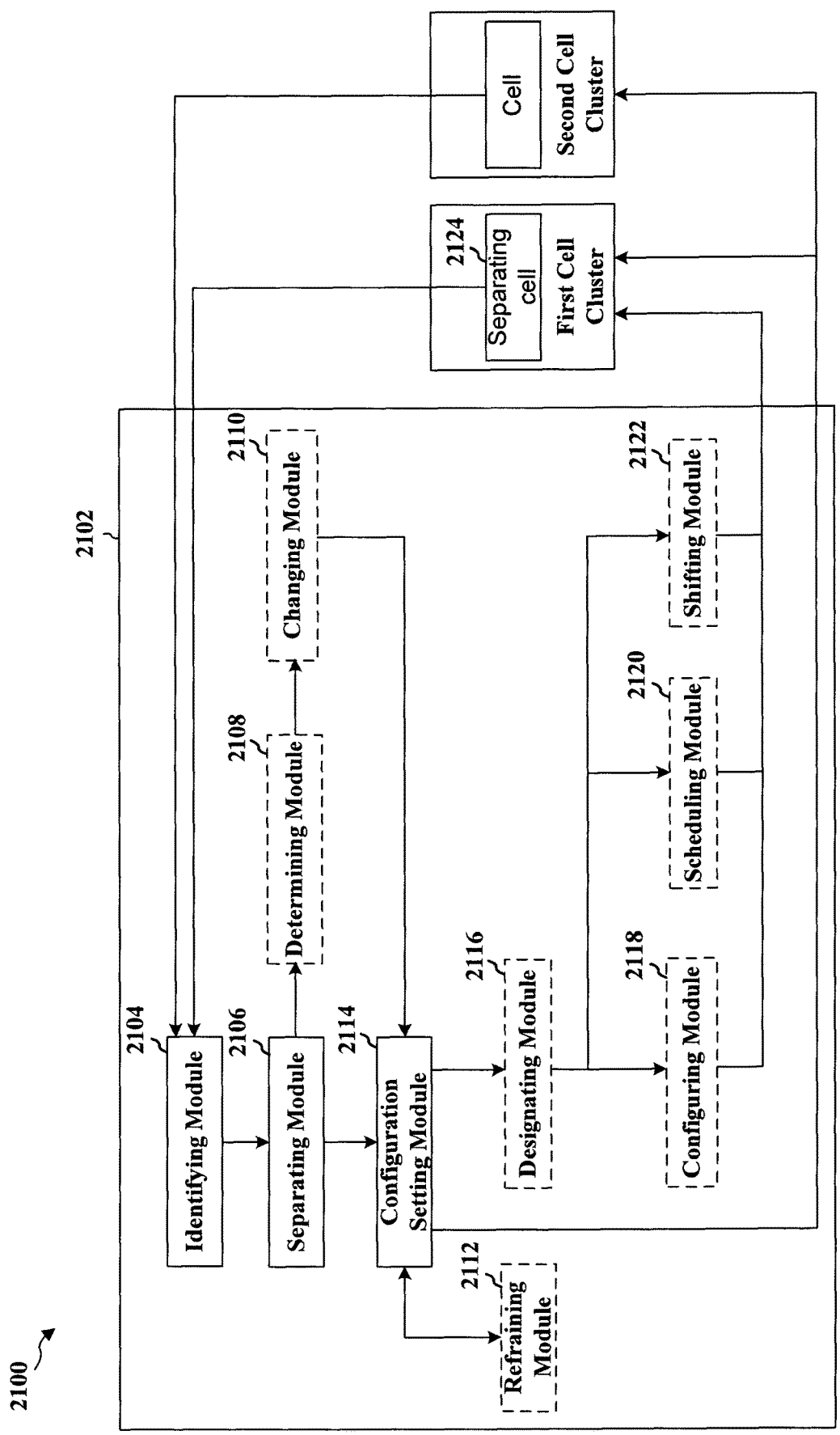
FIG. 21 is a conceptual data flow diagram illustrating the data flow between different modules/means/components in an exemplary apparatus.

FIG. 21 is a conceptual data flow diagram 2100 illustrating the data flow between different modules/means/components in an exemplary apparatus 2102. The apparatus may be an eNB. The apparatus may include an identifying module 2104 that identifies at least one separating cell (e.g., cell 2124) in a cell cluster, the cell cluster including at least two cells having a common TDD subframe configuration, wherein a coupling loss between one cell in the cell cluster and at least another cell in the cell cluster is lower than a predefined threshold. The apparatus may include a separating module 2106 that separates the cell cluster based on the at least one separating cell to form at least a first cell cluster and a second cell cluster.

The apparatus may include a configuration setting module 2114 that sets a first TDD subframe configuration for the first cell cluster and a second TDD subframe configuration for the second cell cluster. In one configuration, the first TDD subframe configuration may be set for the first cluster and the second TDD subframe configuration may be set for the second cluster when the coupling loss is lower than the threshold.

The apparatus may include a determining module 2108 that determines whether a coupling loss between the at least one separating cell and a macro cell is greater than a threshold. The apparatus may include a changing module 2110 that changes a carrier frequency used by the at least one separating cell when the coupling loss is greater than the threshold.

The apparatus may include a refraining module 2112 that refrains from scheduling one or more uplink transmissions in one or more uplink subframes of the separating cell, and refrains from transmitting in one or more downlink subframes of the separating cell.

The apparatus may include a designating module 2116 that designates, as non-anchor subframes, one or more downlink subframes of the first TDD subframe configuration that co-exist with one or more uplink subframes of the second TDD subframe configuration. The designating module 2116 also designates, as anchor subframes, one or more uplink subframes of the first TDD subframe configuration that co-exist with one or more uplink subframes of the second TDD subframe configuration. The designating module 2116 also designates, as the anchor subframes, one or more downlink subframes of the first TDD subframe configuration that co-exist with one or more downlink subframes of the second TDD subframe configuration.

The apparatus may include a configuring module 2118 that configures the one or more downlink subframes of the non-anchor subframes of the separating cell as ABSs.

The apparatus may include a scheduling module 2120 that schedules one or more uplink transmissions only in the one or more uplink subframes in the anchor subframes of the separating cell. The apparatus may include a shifting module 2122 that shifts one or more uplink control signals (e.g., acknowledgments) to the one or more uplink subframes in the anchor subframes of separating cell. The shifting module 2122 also shifts one or more downlink control signal to one or more downlink subframes in the anchor subframes of the separating cell.

The apparatus may include additional modules that perform each of the steps of the algorithm in the aforementioned flow charts of FIGS. 17-20. As such, each step in the aforementioned flow charts of FIGS. 17-20 may be performed by a module and the apparatus may include one or more of those modules. The modules may be one or more hardware components specifically configured to carry out the stated processes/algorithm, implemented by a processor configured to perform the stated processes/algorithm, stored within a computer-readable medium for implementation by a processor, or some combination thereof.

Figure 22:
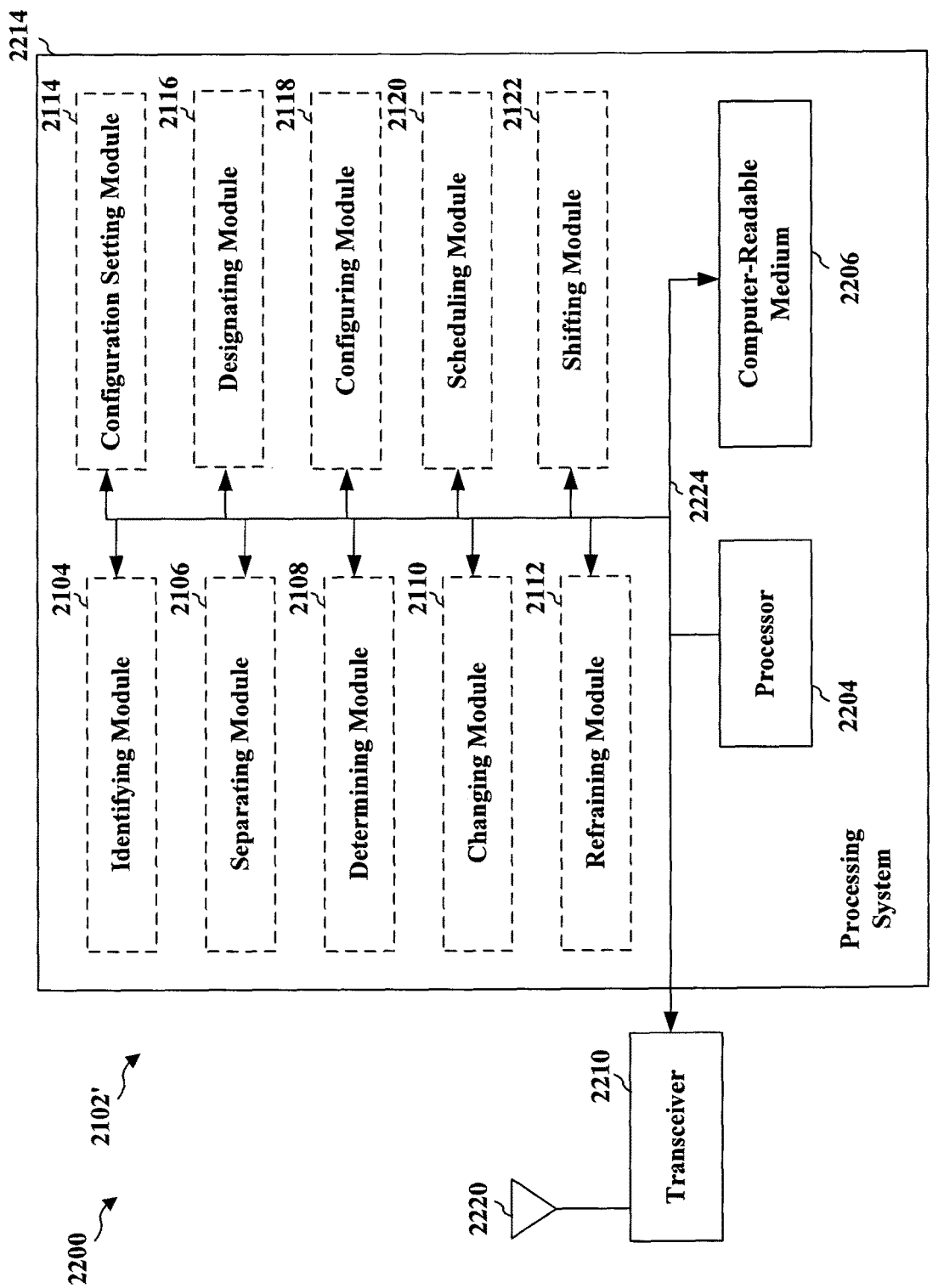
FIG. 22 is a diagram illustrating an example of a hardware implementation for an apparatus employing a processing system.

FIG. 22 is a diagram 2200 illustrating an example of a hardware implementation for an apparatus 2102' employing a processing system 2214. The processing system 2214 may be implemented with a bus architecture, represented generally by the bus 2224. The bus 2224 may include any number of interconnecting buses and bridges depending on the specific application of the processing system 2214 and the overall design constraints. The bus 2224 links together various circuits including one or more processors and/or hardware modules, represented by the processor 2204, the modules 2104, 2106, 2108, 2110, 2112, 2114, 2116, 2118, 2120, and 2122, and the computer-readable medium 2206. The bus 2224 may also link various other circuits such as timing sources, peripherals, voltage regulators, and power management circuits, which are well known in the art, and therefore, will not be described any further.

The processing system 2214 may be coupled to a transceiver 2210. The transceiver 2210 is coupled to one or more antennas 2220. The transceiver 2210 provides a means for communicating with various other apparatus over a transmission medium. The processing system 2214 includes a processor 2204 coupled to a computer-readable medium 2206. The processor 2204 is responsible for general processing, including the execution of software stored on the computer-readable medium 2206. The software, when executed by the processor 2204, causes the processing system 2214 to perform the various functions described supra for any particular apparatus. The computer-readable medium 2206 may also be used for storing data that is manipulated by the processor 2204 when executing software. The processing system further includes at least one of the modules 2104, 2106, 2108, 2110, 2112, 2114, 2116, 2118, 2120, and 2122. The modules may be software modules running in the processor 2204, resident/stored in the computer readable medium 2206, one or more hardware modules coupled to the processor 2204, or some combination thereof. The processing system 2214 may be a component of the eNB 610 and may include the memory 676 and/or at least one of the TX processor 616, the RX processor 670, and the controller/processor 675.

In one configuration, the apparatus 2102/2102' for wireless communication includes means for means for identifying at least one separating cell in a cell cluster, the cell cluster comprising at least two cells having a common time division duplex (TDD) subframe configuration, wherein a coupling loss between one cell in the cell cluster and at least another cell in the cell cluster is lower than a predefined threshold, means for separating the cell cluster based on the at least one separating cell to form at least a first cell cluster and a second cell cluster, means for setting a first TDD subframe configuration for the first cell cluster and a second TDD subframe configuration for the second cell cluster, means for designating, as non-anchor subframes, one or more downlink subframes of the first TDD subframe configuration that co-exist with one or more uplink subframes of the second TDD subframe configuration, means for configuring the one or more downlink subframes of the non-anchor subframes of the separating cell as ABSs, means for designating, as anchor subframes, one or more uplink subframes of the first TDD subframe configuration that co-exist with one or more uplink subframes of the second TDD subframe configuration, means for designating, as the anchor subframes, one or more downlink subframes of the first TDD subframe configuration that co-exist with one or more downlink subframes of the second TDD subframe configuration, means for shifting one or more uplink acknowledgments to the one or more uplink subframes in the anchor subframes of separating cell, means for shifting one or more downlink control signals to the one or more downlink subframes in the anchor subframes of separating cell, means for scheduling one or more uplink transmissions only in the one or more uplink subframes in the anchor subframes of the separating cell, means for determining whether a coupling loss between the at least one separating cell and a macro cell is greater than a threshold, means for changing a carrier frequency used by the at least one separating cell when the coupling loss is greater than the threshold, means for refraining from scheduling one or more uplink transmissions in one or more uplink subframes of the separating cell, and means for refraining from transmitting in one or more downlink subframes of the separating cell.

The aforementioned means may be one or more of the aforementioned modules of the apparatus 2102 and/or the processing system 2214 of the apparatus 2102' configured to perform the functions recited by the aforementioned means. As described supra, the processing system 2214 may include the TX Processor 616, the RX Processor 670, and the controller/processor 675. As such, in one configuration, the aforementioned means may be the TX Processor 616, the RX Processor 670, and the controller/processor 675 configured to perform the functions recited by the aforementioned means.

It is understood that the specific order or hierarchy of steps in the processes disclosed is an illustration of exemplary approaches. Based upon design preferences, it is understood that the specific order or hierarchy of steps in the processes may be rearranged. Further, some steps may be combined or omitted.

The accompanying method claims present elements of the various steps in a sample order, and are not meant to be limited to the specific order or hierarchy presented. The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A method of wireless communication at a base station, comprising:

forming a cell cluster comprising at least two cells having a common time division duplex (TDD) subframe configuration based on each cell in the cluster having a coupling loss between at least another cell in the cluster that is lower than a first coupling loss threshold;

identifying, by the base station, at least one separating cell inside the formed cell cluster from among the at least two cells of the cell cluster, wherein the at least one separating cell is identified from within the formed cell cluster based on the coupling loss between the at least one separating cell and each of the other cells of the cell cluster being lower than a second coupling loss threshold, wherein the second coupling loss threshold is different than the first coupling loss threshold;

separating, by the base station, the cell cluster based on removing the at least one separating cell from the cell cluster to form at least a first cell cluster and a second cell cluster, wherein the first cell cluster comprises the separating cell and at least one additional cell from among the at least two cells comprised in the cell cluster;

setting, by the base station, a first TDD subframe configuration for the first cell cluster and a second TDD subframe configuration for the second cell cluster;

transmitting and receiving communication from the first cell cluster based on the first TDD subframe configuration; and transmitting communication and receiving communication from the second cell cluster based on the second TDD subframe configuration.

2. The method of claim 1, further comprising:
designating, as non-anchor subframes, one or more downlink subframes of the first TDD subframe configuration that co-exist with one or more uplink subframes of the second TDD subframe configuration; and
configuring the one or more downlink subframes of the non-anchor subframes of the separating cell as almost blank subframes (ABSs).

3. The method of claim 2, wherein the TDD subframe configuration of the separating cell comprises more downlink subframes than uplink subframes.

4. The method of claim 1, further comprising:
designating, as anchor subframes, one or more uplink subframes of the first TDD subframe configuration that co-exist with one or more uplink subframes of the second TDD subframe configuration;

designating, as the anchor subframes, one or more downlink subframes of the first TDD subframe configuration that co-exist with one or more downlink subframes of the second TDD subframe configuration; and
shifting at least an uplink control signal to one of the one or more uplink subframes in the anchor subframes of the separating cell or a downlink control signal to one of the one or more downlink subframes in the anchor subframes of the separating cell.

5. The method of claim 4, wherein the TDD subframe configuration of the separating cell comprises more uplink subframes than downlink subframes.

6. The method of claim 1, further comprising:
designating, as anchor subframes, one or more uplink subframes of the first TDD subframe configuration that co-exist with one or more uplink subframes of the second TDD subframe configuration; and
scheduling one or more uplink transmissions to the separating cell, the one or more uplink transmissions being limited to the one or more uplink subframes of the anchor subframes.

7. The method of claim 1, further comprising:
determining whether a coupling loss between the at least one separating cell and a macro cell is greater than a third threshold; and
changing a carrier frequency used by the at least one separating cell when the coupling loss is greater than the third threshold.

8. The method of claim 7, wherein the first TDD subframe configuration is set for the first cell cluster and the second TDD subframe configuration is set for the second cell cluster when the coupling loss is greater than the third threshold.

9. The method of claim 1, further comprising:
refraining from scheduling one or more uplink transmissions in one or more uplink subframes of the separating cell; and
refraining from transmitting in one or more downlink subframes of the separating cell.

10. An apparatus for wireless communication at a base station, comprising:
means for forming a cell cluster comprising at least two cells having a common time division duplex (TDD) subframe configuration based on each cell in the cluster having a coupling loss between at least another cell in the cluster that is lower than a first coupling loss threshold;
means for identifying, by the base station, at least one separating cell inside the formed cell cluster from among the at least two cells of the cell cluster, wherein the at least one separating cell is identified from within the formed cell cluster based on the coupling loss between the at least one separating cell and each of the other cells of the cell cluster being lower than a second coupling loss threshold, wherein the second coupling loss threshold is different than the first coupling loss threshold;
means for separating, by the base station, the cell cluster based on removing the at least one separating cell from the cell cluster to form at least a first cell cluster and a second cell cluster, wherein the first cell cluster comprises the separating cell and at least one additional cell from among the at least two cells comprised in the cell cluster;
means for setting, by the base station, a first TDD subframe configuration for the first cell cluster and a second TDD subframe configuration for the second cell cluster; and means for transmitting and receiving communication from the first cell cluster based on the first TDD subframe configuration and for transmitting communication and receiving communication from the second cell cluster based on the second TDD subframe configuration.

11. The apparatus of claim 10, further comprising:
means for designating, as non-anchor subframes, one or more downlink subframes of the first TDD subframe configuration that co-exist with one or more uplink subframes of the second TDD subframe configuration; and
means for configuring the one or more downlink subframes of the non-anchor subframes of the separating cell as almost blank subframes (ABSs).

12. The apparatus of claim 11, wherein the TDD subframe configuration of the separating cell comprises more downlink subframes than uplink subframes.

13. The apparatus of claim 10, further comprising:
means for designating, as anchor subframes, one or more uplink subframes of the first TDD subframe configuration that co-exist with one or more uplink subframes of the second TDD subframe configuration;
means for designating, as the anchor subframes, one or more downlink subframes of the first TDD subframe configuration that co-exist with one or more downlink subframes of the second TDD subframe configuration; and
means for shifting at least an uplink control signal to one of the one or more uplink subframes in the anchor subframes of the separating cell or a downlink control signal to one of the one or more downlink subframes in the anchor subframes of the separating cell.

14. The apparatus of claim 10, further comprising:
means for designating, as anchor subframes, one or more uplink subframes of the first TDD subframe configuration that co-exist with one or more uplink subframes of the second TDD subframe configuration; and
means for scheduling one or more uplink transmissions to the separating cell, the one or more uplink transmissions being limited to the one or more uplink subframes of the anchor subframes.

15. The apparatus of claim 14, wherein the TDD subframe configuration of the separating cell comprises more uplink subframes than downlink subframes.

16. The apparatus of claim 10, further comprising:
means for determining whether a coupling loss between the at least one separating cell and a macro cell is greater than a third threshold; and
means for changing a carrier frequency used by the at least one separating cell when the coupling loss is greater than the third threshold.

17. The apparatus of claim 16, wherein the first TDD subframe configuration is set for the first cell cluster and the second TDD subframe configuration is set for the second cell cluster when the coupling loss is greater than the third threshold.

18. The apparatus of claim 10, further comprising:
means for refraining from scheduling one or more uplink transmissions in one or more uplink subframes of the separating cell; and
means for refraining from transmitting in one or more downlink subframes of the separating cell.

19. An apparatus for wireless communication at a base station, comprising:
memory; and at least one processor coupled to the memory and configured to:
form a cell cluster comprising at least two cells having a common time division duplex (TDD) subframe configuration based on each cell in the cluster having a coupling loss between at least another cell in the cluster that is lower than a first coupling loss threshold;
identify, by the base station, at least one separating cell inside the formed cell cluster from among the at least two cells of the cell cluster, wherein the at least one separating cell is identified from within the formed cell cluster based on the coupling loss between the at least one separating cell and each of the other cells of the cell cluster being lower than a second coupling loss threshold, wherein the second coupling loss threshold is different than the first coupling loss threshold;
separate, by the base station, the cell cluster based on removing the at least one separating cell from the cell cluster to form at least a first cell cluster and a second cell cluster, wherein the first cell cluster comprises the separating cell and at least one additional cell from among the at least two cells comprised in the cell cluster;
set, by the base station, a first TDD subframe configuration for the first cell cluster and a second TDD subframe configuration for the second cell cluster;
transmit and receive communication from the first cell cluster based on the first TDD subframe configuration; and
transmit communication and receive communication from the second cell cluster based on the second TDD subframe configuration.

20. The apparatus of claim 19, wherein the processing system is further configured to:
designate, as non-anchor subframes, one or more downlink subframes of the first TDD subframe configuration that co-exist with one or more uplink subframes of the second TDD subframe configuration; and
configure the one or more downlink subframes of the non-anchor subframes of the separating cell as almost blank subframes (ABSs).

21. The apparatus of claim 20, wherein the TDD subframe configuration of the separating cell comprises more downlink subframes than uplink subframes.

22. The apparatus of claim 19, wherein the processing system is further configured to:
designate, as anchor subframes, one or more uplink subframes of the first TDD subframe configuration that co-exist with one or more uplink subframes of the second TDD subframe configuration;
designate, as the anchor subframes, one or more downlink subframes of the first TDD subframe configuration that co-exist with one or more downlink subframes of the second TDD subframe configuration; and
shift at least an uplink control signal to one of the one or more uplink subframes in the anchor subframes of the separating cell or a downlink control signal to one of the one or more downlink subframes in the anchor subframes of the separating cell.

23. The apparatus of claim 19, wherein the processing system is further configured to:
designate, as anchor subframes, one or more uplink subframes of the first TDD subframe configuration that co-exist with one or more uplink subframes of the second TDD subframe configuration; and
schedule one or more uplink transmissions to the separating cell, the one or more uplink transmissions being limited to the one or more uplink subframes of the anchor subframes.

24. The apparatus of claim 23, wherein the TDD subframe configuration of the separating cell comprises more uplink subframes than downlink subframes.

25. The apparatus of claim 19, wherein the processing system is further configured to:
determine whether a coupling loss between the at least one separating cell and a macro cell is greater than a third threshold; and
change a carrier frequency used by the at least one separating cell when the coupling loss is greater than the third threshold.

26. The apparatus of claim 25, wherein the first TDD subframe configuration is set for the first cell cluster and the second TDD subframe configuration is set for the second cell cluster when the coupling loss is greater than the third threshold.

27. The apparatus of claim 19, wherein the processing system is further configured to:
refrain from scheduling one or more uplink transmissions in one or more uplink subframes of the separating cell; and
refrain from transmitting in one or more downlink subframes of the separating cell.

28. A non-transitory computer-readable medium storing computer executable code for wireless communication at a base station, the code when executed by a processor cause the processor to:
form a cell cluster comprising at least two cells having a common time division duplex (TDD) subframe configuration based on each cell in the cluster having a coupling loss between at least another cell in the cluster that is lower than a first coupling loss threshold;
identify, by the base station, at least one separating cell inside the formed cell cluster from among the at least two cells of the cell cluster, wherein the at least one separating cell is identified from within the formed cell cluster based on the coupling loss between the at least one separating cell and each of the other cells of the cell cluster being lower than a second coupling loss threshold, wherein the second coupling loss threshold is different than the first coupling loss threshold;
separate, by the base station, the cell cluster based on removing the at least one separating cell from the cell cluster to form at least a first cell cluster and a second cell cluster, wherein the first cell cluster comprises the separating cell and at least one additional cell from among the at least two cells comprised in the cell cluster;
set, by the base station, a first TDD subframe configuration for the first cell cluster and a second TDD subframe configuration for the second cell cluster;
transmit and receive communication from the first cell cluster based on the first TDD subframe configuration; and
transmit communication and receive communication from the second cell cluster based on the second TDD subframe configuration.

29. The computer-readable medium of claim 28, further comprising code to:
designate, as non-anchor subframes, one or more downlink subframes of the first TDD subframe configuration that co-exist with one or more uplink subframes of the second TDD subframe configuration; and configure the one or more downlink subframes of the non-anchor subframes of the separating cell as almost blank subframes (ABSs).

30. The computer-readable medium of claim 29, wherein the TDD subframe configuration of the separating cell comprises more downlink subframes than uplink subframes.

31. The computer-readable medium of claim 28, further comprising code to:
designate, as anchor subframes, one or more uplink subframes of the first TDD subframe configuration that co-exist with one or more uplink subframes of the second TDD subframe configuration;
designate, as the anchor subframes, one or more downlink subframes of the first TDD subframe configuration that co-exist with one or more downlink subframes of the second TDD subframe configuration; and
shift at least an uplink control signal to one of the one or more uplink subframes in the anchor subframes of the separating cell or a downlink control signal to one of the one or more downlink subframes in the anchor subframes of the separating cell.

32. The computer-readable medium of claim 28, further comprising code to:
designate, as anchor subframes, one or more uplink subframes of the first TDD subframe configuration that co-exist with one or more uplink subframes of the second TDD subframe configuration; and
schedule one or more uplink transmissions to the separating cell, the one or more uplink transmissions being limited to the one or more uplink subframes of the anchor subframes.

33. The computer-readable medium of claim 28, wherein the TDD subframe configuration of the separating cell comprises more uplink subframes than downlink subframes.

34. The computer-readable medium of claim 28, further comprising code to:
determine whether a coupling loss between the at least one separating cell and a macro cell is greater than a third threshold; and
change a carrier frequency used by the at least one separating cell when the coupling loss is greater than the third threshold.

35. The computer-readable medium of claim 34, wherein the first TDD subframe configuration is set for the first cell cluster and the second TDD subframe configuration is set for the second cell cluster when the coupling loss is greater than the third threshold.

36. The computer-readable medium of claim 28, further comprising code to:
refrain from scheduling one or more uplink transmissions in one or more uplink subframes of the separating cell; and
refrain from transmitting in one or more downlink subframes of the separating cell.

* * * * *